United States Patent
Takeuchi et al.

[11] Patent Number: 5,963,674
[45] Date of Patent: Oct. 5, 1999

[54] IMAGE DATA ENCODING APPARATUS

[75] Inventors: Minoru Takeuchi; Kazuhiko Kondo, both of Ogaki; Shigeyuki Okada, Hashima, all of Japan

[73] Assignee: Sanyo Electric Co., Ltd., Osaka, Japan

[21] Appl. No.: 08/910,915

[22] Filed: Aug. 13, 1997

[30] Foreign Application Priority Data

Aug. 28, 1996 [JP] Japan .................................. 8-226769
Oct. 31, 1996 [JP] Japan .................................. 8-290704
Oct. 31, 1996 [JP] Japan .................................. 8-290705

[51] Int. Cl.$^6$ ........................................................ G06K 9/36
[52] U.S. Cl. ............................................ 382/239; 348/419
[58] Field of Search .................................. 382/238, 239, 382/248, 251; 348/420, 409, 419

[56] References Cited

U.S. PATENT DOCUMENTS

| | | | |
|---|---|---|---|
| 5,387,938 | 2/1995 | Fukuda et al. .......................... | 348/420 |
| 5,721,590 | 2/1998 | Sanpei ..................................... | 348/419 |
| 5,748,249 | 5/1998 | Fujiwara ................................. | 348/419 |
| 5,847,465 | 12/1998 | Sanpei ..................................... | 348/419 |
| 5,861,922 | 1/1999 | Marashita et al. ...................... | 348/420 |

*Primary Examiner*—Amelia Au
*Assistant Examiner*—Jingge Wu
*Attorney, Agent, or Firm*—Sheridan Ross P.C.

[57] ABSTRACT

An image data encoding apparatus encodes image data at a high speed while minimizing the deterioration of the image quality on a reproduced screen. The apparatus includes an encoding circuit, a code quantity counter and a control circuit. The control circuit compares a total code quantity with a reference code quantity. When the total code quantity exceeds the reference code quantity, the control circuit further compares an excessive quantity with a brought forward code quantity. The control circuit instructs an interruption of generation of the code image data by the encoding circuit when the excessive quantity is larger than the brought forward code quantity.

18 Claims, 19 Drawing Sheets

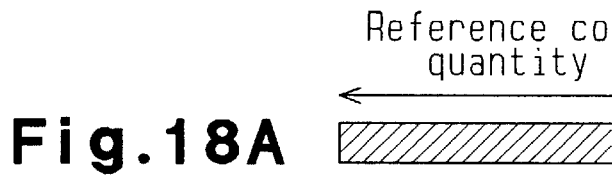
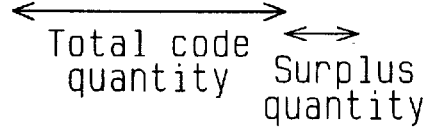
Fig.18A
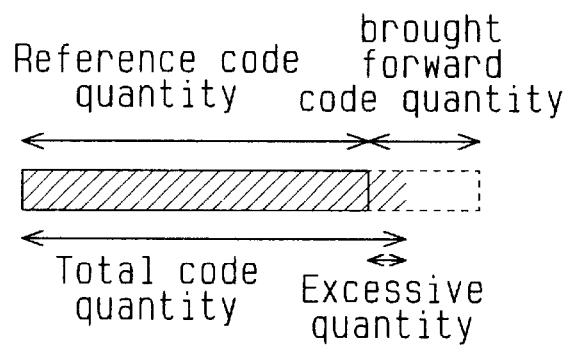
Fig.18B
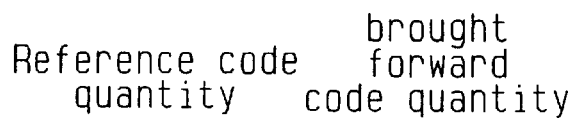
Fig.18C
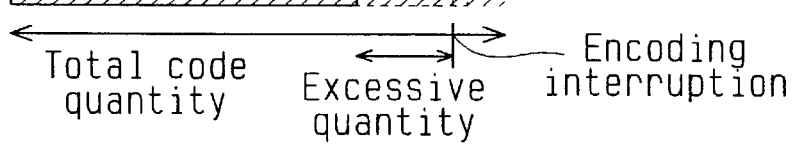
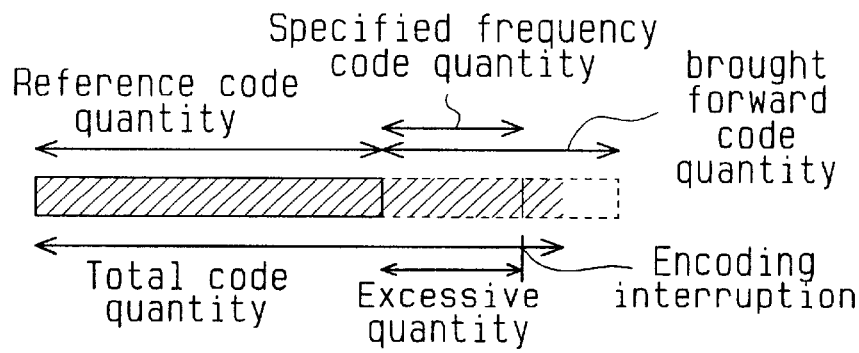
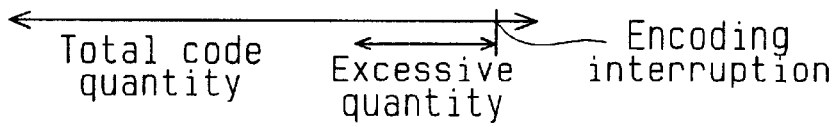
Fig.18D

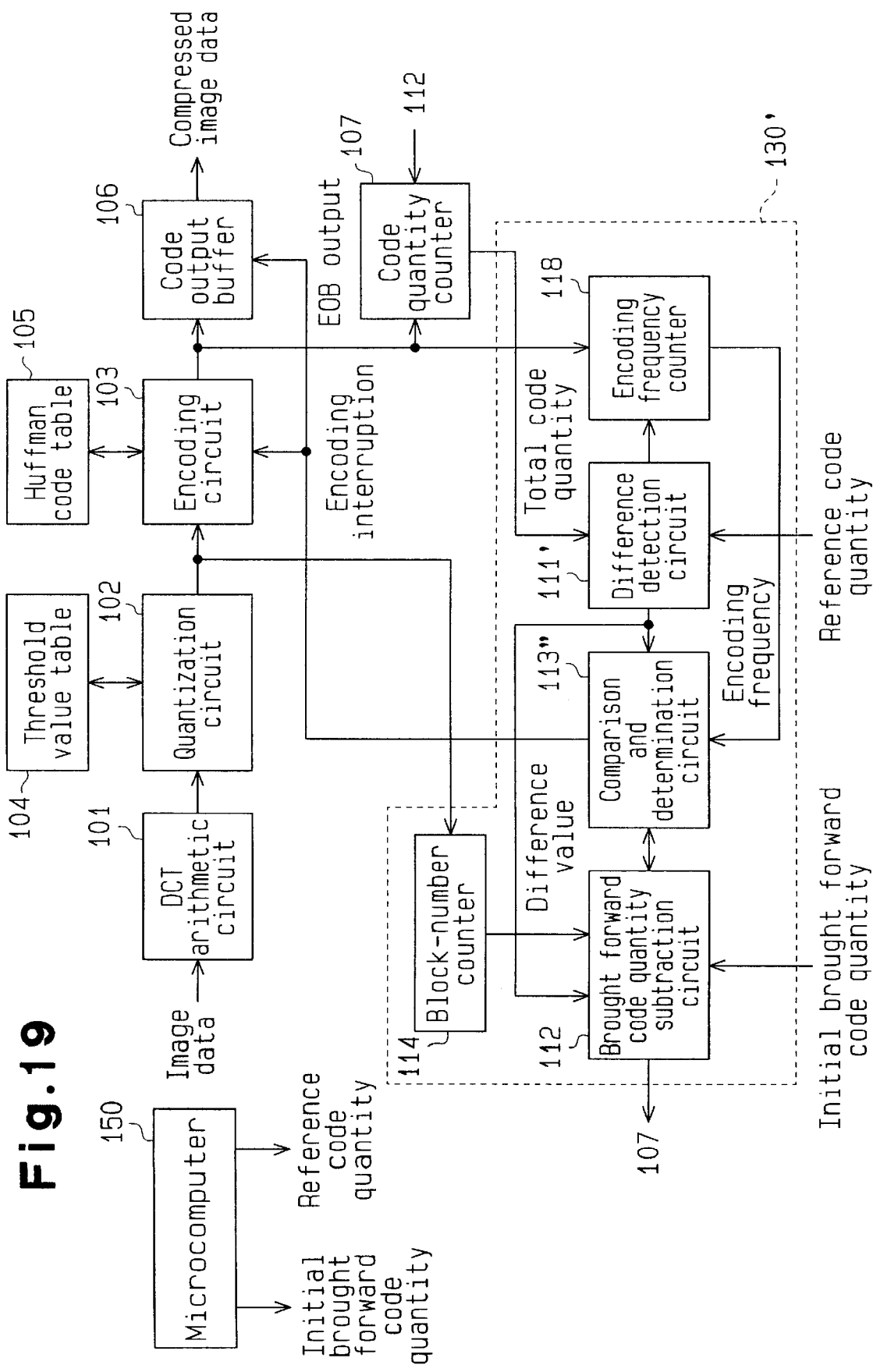

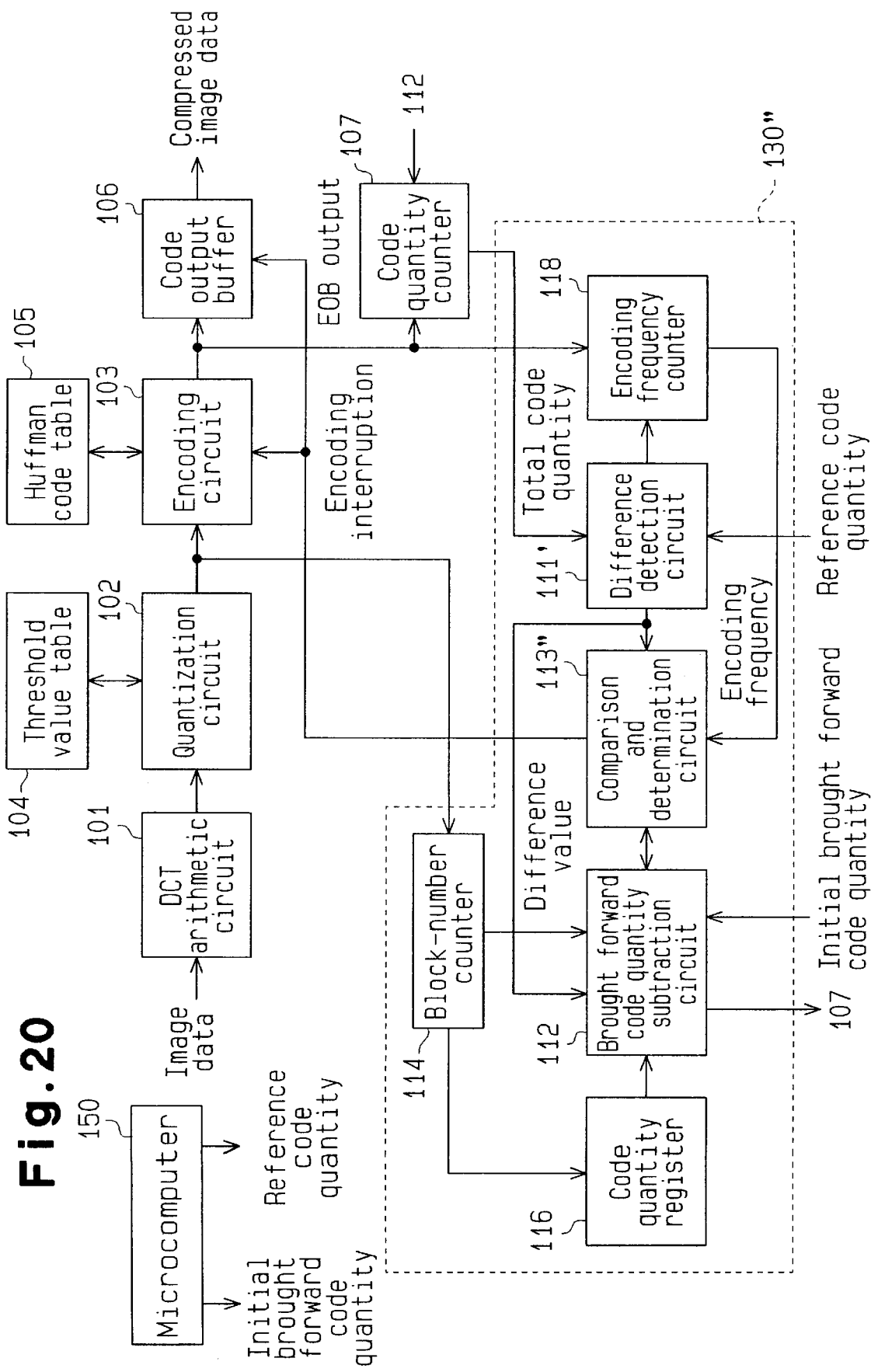

IMAGE DATA ENCODING APPARATUS

BACKGROUND OF THE INVENTION

1. Field of the Invention

The present invention relates generally to an image data encoding apparatus for variable-length-encoding image data to generate compressed image data and, more particularly, to control of total code quantity of the compressed image data generated through a block encoding process.

2. Description of the Related Art

Various image-data compression methods are proposed to efficiently transmit and store image data. JPEG (Joint Photographic Expert Group) proposes a method for encoding internationally-standardized image data as one of the methods. The JPEG encoding method is referred to as "JPEG algorithm" and is widely used for image data processing in a CD-ROM system and the like.

In the case of the JPEG algorithm, one screen Sc is encoded every B11 to Bmn blocks, each of which comprises 8×8 pixels as shown in FIG. 1. Each block includes data corresponding to 64 (8 rows×8 columns) pixels P11 to P88.

FIG. 2 shows an encoding circuit following the JPEG algorithm, that is, a JPEG encoder includes a DCT arithmetic circuit 1, a quantization circuit 2, an encoding circuit 3, a threshold value table 4, and a Huffman code table 5.

The DCT arithmetic circuit 1 receives image data in units of blocks and generates 64 DCT coefficient data values by applying two-dimensional discrete cosine transform (DCT) to each block. The quantization circuit 2 receives the 64 DCT coefficient data values from the DCT arithmetic circuit 1 and quantizes the 64 DCT coefficient data values while referring to threshold values stored in the threshold value table 4. A threshold value determines the compression rate of image data or the quality of a reproduced image and it is optionally set in accordance with the purpose for using an apparatus. The encoding circuit 3 receives quantized DCT coefficient data from the quantization circuit 2 and performs variable-length-encoding of the quantized DCT coefficient data in accordance with Huffman codes stored in the Huffman code table 5 to generate compressed image data. A Huffman code is a variable-length code assigned to each quantized DCT coefficient data value in accordance with the appearance frequency of an expected DCT coefficient data value. That is, a short code is assigned to a DCT coefficient data value having a high appearance frequency.

FIG. 3 shows the frequency components for a plurality of DCT coefficient data values, generated through DCT arithmetic processing for each block of the DCT arithmetic circuit 1. At this time, as shown in FIG. 3, DCT coefficient data having a low frequency component is arranged at the left top of a block BL and DCT coefficient data having a high frequency component is arranged at the right bottom of the block BL. The encoding circuit 3 first encodes the quantized DCT coefficient data present at the left top end and then encodes each DCT coefficient data value while performing zigzag scanning in the diagonal direction. Finally, the quantized DCT coefficient data present at the right bottom end is encoded. In this case, a total code quantity of the compressed image data in one block is limited to a predetermined upper limit value. Therefore, encoding is limited so that the total code quantity does not exceed the upper limit value. For example, the JPEG encoder is configured to count the number of codes of code data (compressed imaged data) supplied from the encoding circuit 3 and supply a signal indicating the interruption of encoding process to the encoding circuit 3 before the total code quantity exceeds the upper limit value.

In the case of normal encoding process, several code data values are simultaneously output from the encoding circuit 3. Therefore, as shown in FIG. 3, when encoding of a DCT coefficient data value Da is completed, the JPEG encoder estimates total code quantity when encoding of a DCT coefficient data value Db is completed. The data value Db occurs after the DCT coefficient data value Da at intervals of several data values. The JPEG encoder determines whether the estimated total code quantity exceeds the upper limit value. When the total code quantity does not exceed the upper limit value, the JPEG encoder allows output of the code data of the DCT coefficient data value Db. However, when the total code quantity exceeds the upper limit value, the JPEG encoder limits the outputs of the code data for the DCT coefficient data values present after the DCT coefficient data value Da and supplies an End-Of-Block (EOB) code to the encoding circuit 3.

However, the above interruption of encoding processing allows truncation of some DCT coefficient data values (high-frequency components in the case of the above example) in one block. As a result, when compressed image data is extended, complete original image data is not able to be reproduced. This deteriorates the image quality of a reproduced screen.

One method to minimize the deterioration of the image quality is to encode the image data on one screen again at a high compression rate when a total code quantity of one block exceeds the upper limit value. When the total code quantity of compressed image data output from the encoding circuit 3 exceeds the upper limit value, the JPEG decoder changes threshold values of the quantization circuit 2 in accordance with the excessive quantity. The quantization circuit 2 performs quantization by using a changed threshold value. In the case of this method, it is necessary to encode the image data for one screen twice. As a result, the encoding time undesirably increases. In the case of moving pictures of a television signal (NTSC system) or the like, a screen comprising 30 frames is continuously supplied in one second. As a result, the image encoding speed may be slower than the screen supply speed.

Thus there is a need for improved high-speed encoding methods for image data.

SUMMARY OF THE INVENTION

Broadly speaking, the present invention relates to an image data encoding apparatus for encoding image data at a high speed while minimizing the deterioration of the image quality for a reproduced screen. The present invention can be implemented in numerous ways, including as an apparatus and method.

A first embodiment of the invention pertains to an apparatus for encoding image data of one screen separated into a plurality of blocks and generating code image data. The image data is encoded for each block. The apparatus includes an encoding circuit, a code quantity counter and a control circuit. The encoding circuit encodes image data of each block in accordance with a predetermined algorithm to generate code image data. The code quantity counter, which is connected to the encoding circuit, counts the number of codes of the code image data and accumulates the counted value to generate a total code quantity of code image data of one block. The control circuit, which is connected to the encoding circuit and the code quantity counter, receives the total code quantity and controls an operation of the encoding circuit in accordance with a check result of the total code quantity using a reference code quantity and a brought forward code quantity. The control circuit compares the total code quantity with the reference code quantity. When the total code quantity exceeds the reference code quantity, the control circuit further compares the excessive quantity of the total code quantity to the reference code quantity with the brought forward code quantity. The control circuit instructs an interruption of generation of the code image data to the encoding circuit when the excessive quantity is larger than the brought forward code quantity.

A second embodiment of the invention pertains to an apparatus for encoding image data of one screen separated into a plurality of blocks and generating code image data. The image data is encoded for each block. The apparatus includes an encoding circuit, a code quantity counter and a control circuit. The encoding circuit encodes image data of each block in accordance with a predetermined algorithm to generate code image data. The code quantity counter, which is connected to the encoding circuit, counts the number of codes of the code image data and accumulates the counted value to generate a total code quantity of code image data of one block. The control circuit, which is connected to the encoding circuit and the code quantity counter, receives the total code quantity and controls an operation of the encoding circuit in accordance with a check result of the total code quantity using a reference code quantity and a brought forward code quantity. The brought forward code quantity includes a variable brought forward code quantity and a fixed code quantity. The control circuit compares the total code quantity with the reference code quantity. When the total code quantity exceeds the reference code quantity, the control circuit further compares the excessive quantity of the total code quantity to the reference code quantity with the variable brought forward code quantity. The control circuit instructs an interruption of generation of the code image data to the encoding circuit when the excessive quantity is larger than the variable brought forward code quantity. The control circuit compares the variable brought forward code quantity and the fixed brought forward code quantity and instructs an interruption of generation of the code image data to the encoding circuit when the variable brought forward code quantity exceeds the fixed brought forward code quantity.

A third embodiment of the invention pertains to an apparatus for encoding image data of one screen separated into a plurality of blocks and generating code image data. The image data is encoded for each block. The apparatus includes an encoding circuit, a code quantity counter and a control circuit. The encoding circuit encodes image data of each block in accordance with a predetermined algorithm to generate code image data. The code quantity counter, which is connected to the encoding circuit, counts the number of codes of the code image data and accumulates the counted value to generate a total code quantity of code image data of one block. The control circuit, which is connected to the encoding circuit and the code quantity counter, receives the total code quantity and controls an operation of the encoding circuit in accordance with a check result of the total code quantity using a reference code quantity and a brought forward code quantity. The control circuit compares the total code quantity with the reference code quantity. When the total code quantity exceeds the reference code quantity, the control circuit further compares the excessive quantity of the total code quantity to the reference code quantity with the brought forward code quantity. The control circuit instructs an interruption of generation of the code image data to the encoding circuit when the excessive quantity is larger than the brought forward code quantity. After the total code quantity exceeds the reference code quantity, the control circuit counts the encoding number of times of the encoding circuit and instructs an interruption of generation of the code image data to the encoding circuit when the counted value reaches a predetermined value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together objects and advantages thereof, may best be understood by reference to the following description of the presently preferred embodiments together with the accompanying drawings in which:

FIGS. 18A to 18D are diagrams showing the control of the number of codes of each block image data using a brought forward code quantity for each case;

FIG. 19 is a block diagram showing an image data encoding apparatus according to an eighth embodiment of the present invention; and FIG. 20 is a block diagram showing an image data encoding apparatus according to a ninth embodiment of the present invention.

DETAILED DESCRIPTION OF THE PREFERRED EMBODIMENTS (First Embodiment)

Figure 1:
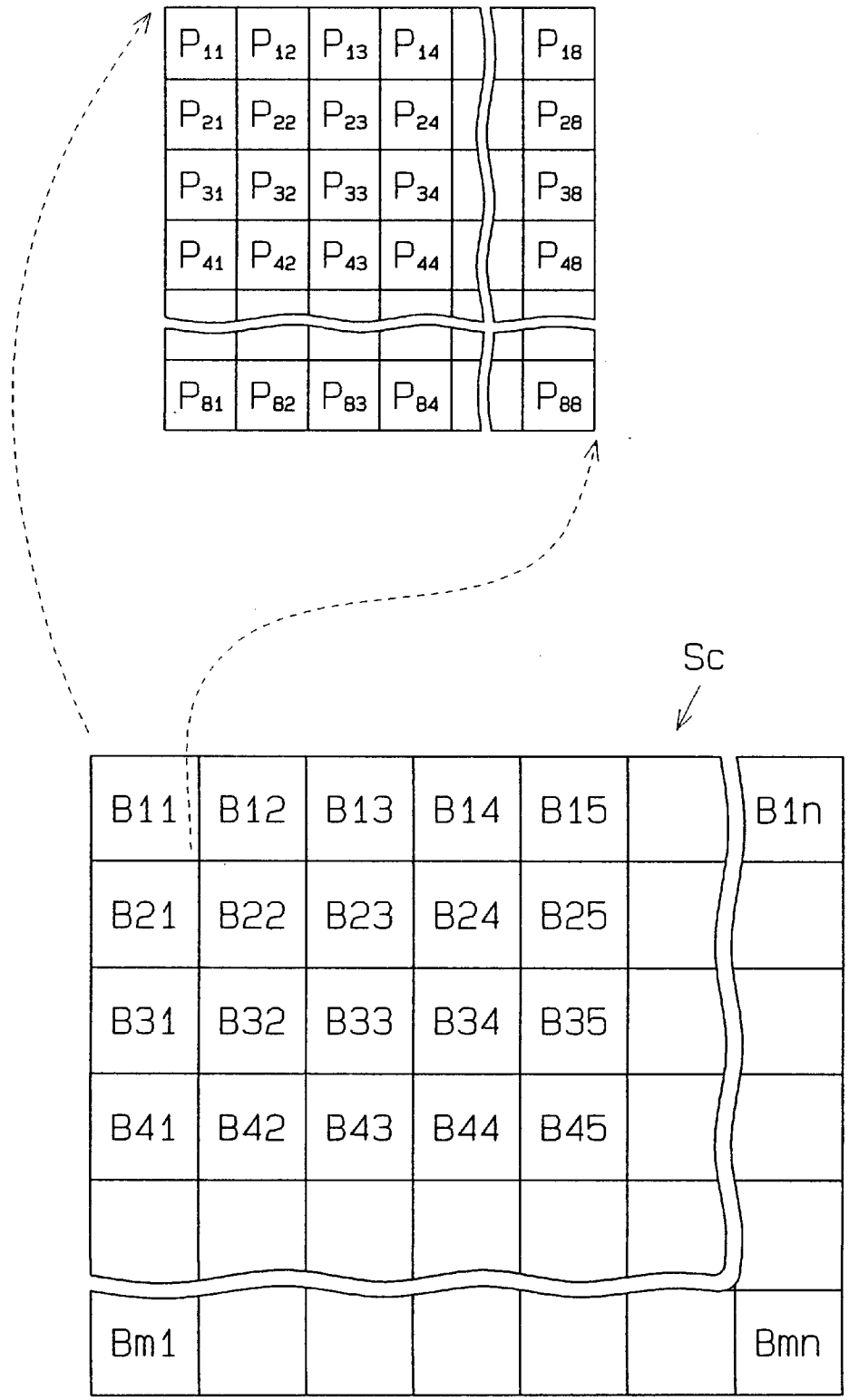
FIG. 1 shows one screen comprising a plurality of blocks to be processed in accordance with the JPEG algorithm.
Figure 2:
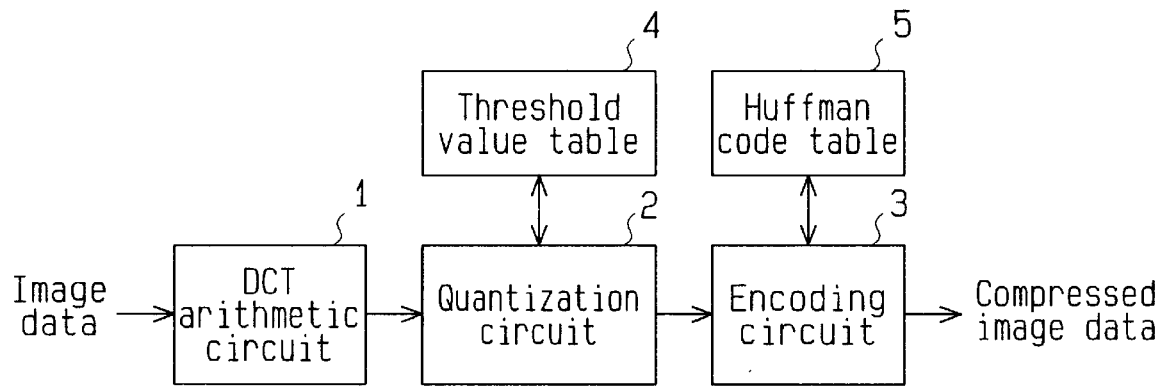
FIG. 2 is a block diagram showing a conventional JPEG encoder.
Figure 3:
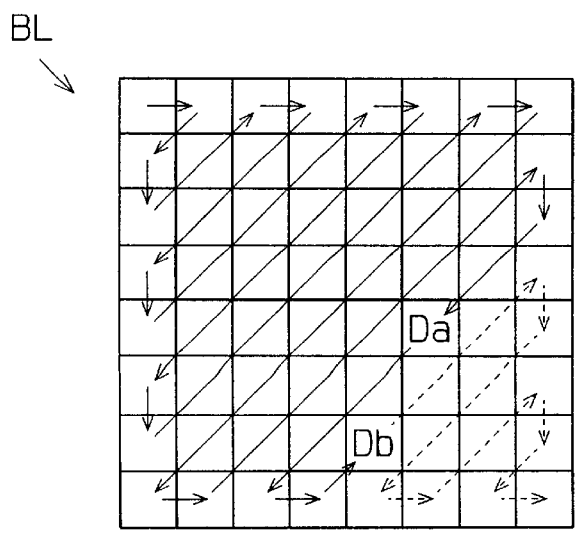
FIG. 3 is a diagram showing the scanning sequence of quantized data in the case of encoding by the JPEG encoder in FIG. 2.
Figure 4:
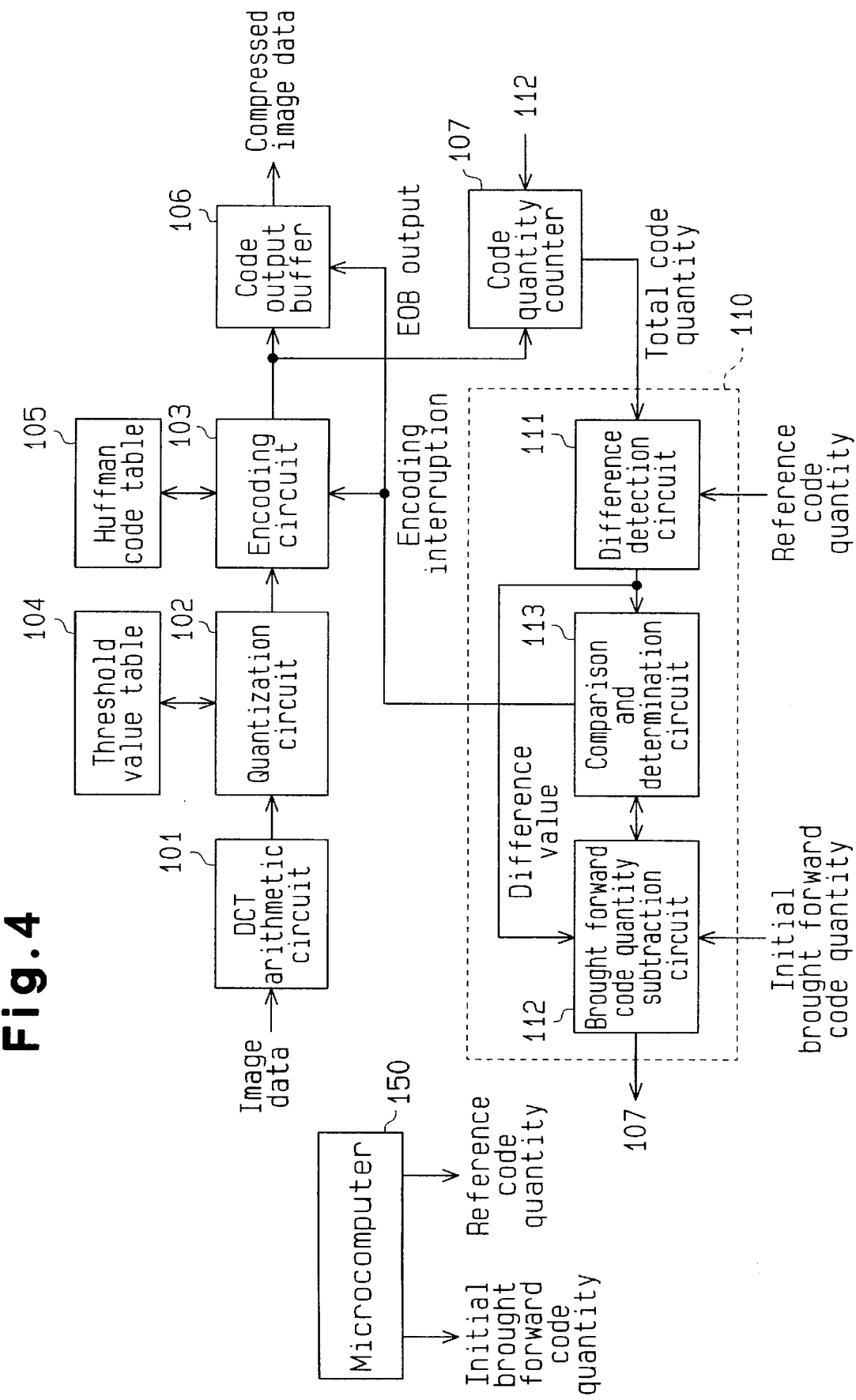
FIG. 4 is a block diagram showing an image data encoding apparatus according to a first embodiment of the present invention.

An image data encoding apparatus of the first embodiment of the present invention will be described below by referring to the accompanying drawings. As shown in FIG. 4, the image data encoding apparatus includes a DCT arithmetic circuit 101, a quantization circuit 102, an encoding circuit 103, a threshold value table 104, a Huffman code table 105, a code output buffer 106, a code quantity counter 107, and a code quantity control circuit 110.

The DCT arithmetic circuit 101 receives image data in units of blocks and performs discrete cosine transform (DCT) on each block to generate DCT coefficient data. The quantization circuit 102 quantizes DCT coefficient data while referring to threshold values stored in the threshold value table 4. The encoding circuit 103 performs variable-length-encoding of the quantized DCT coefficient data in accordance with Huffman codes stored in the Huffman code table 105 and generates encoded data (compressed image data).

The code output buffer 106 buffers the compressed image data continuously supplied from the encoding circuit 103 and outputs either of the compressed image data or an End-Of-Block (EOB) code in accordance with an instruction sent from the code quantity control circuit 110. The EOB code is generated in accordance with the instruction of the control circuit 110 immediately after one-block encoding processing is interrupted to show the end of image data processing for one block.

The code quantity counter 107 counts the number of codes of the compressed image data supplied from the encoding circuit 103 and computes a total code quantity of the compressed image data for one block by accumulating counted values.

The code quantity control circuit 110 checks the total code quantity of the compressed image data sent from the code quantity counter 107 by using a brought forward code quantity and a reference code quantity. The code quantity control circuit 110 also controls the operations of the encoding circuit 103 and code output buffer 106 in accordance with the check result. The control circuit 110 receives an initial value of the brought forward code quantity from a microcomputer 150. The brought forward code quantity is updated whenever encoding of one block is completed.

The control circuit 110 subtracts the reference code quantity from the total code quantity to produce a difference value (excessive or surplus code quantity). Then, the control circuit 110 determines whether the difference value is smaller or larger than the brought forward code quantity based on the subtraction result. When the difference value is smaller than the brought forward code quantity, the control circuit 110 allows supply of code data (compressed image data) from the encoding circuit 103 to the code buffer 106. When the difference value is larger than the brought forward code quantity, the control circuit 110 instructs the encoding circuit 103 to output an EOB code in order to interrupt the encoding process.

The control circuit 110 generates a carried forward code quantity for the next block after encoding of one block is completed. That is, when the total code quantity exceeds the reference code quantity, the control circuit 110 subtracts the difference value (excessive code quantity) from the brought forward code quantity to generate a decreased brought forward code quantity as a carried forward code quantity. When total code quantity does not reach the reference code quantity, the control circuit 110 adds the difference value (surplus code quantity) to the brought forward code quantity to generate an increased brought forward code quantity as a carried forward code quantity.

The code quantity control circuit 110 includes a difference detection circuit 111, a brought forward code quantity subtraction circuit 112, and a comparison and determination circuit 113.

The difference detection circuit 111 receives the reference code quantity of one block from the microcomputer 150 and further receives the total code quantity of the block currently being encoded from the code quantity counter 107. The detection circuit 111 computes a difference value between the reference code quantity and the total code quantity. The detection circuit 111 outputs a negative difference value as a surplus code quantity when the total code quantity is smaller than the reference code quantity and a positive difference value as an excessive code quantity when the former is larger than the latter.

The comparison and determination circuit 113 receives the difference value from the difference detection circuit 111 and the brought forward code quantity from the subtraction circuit 112 to compare the difference value with the brought forward code quantity. When the difference value exceeds the brought forward code quantity, the determination circuit 113 supplies a signal showing the interruption of encoding processing to the encoding circuit 103 and instructs the output of the EOB code from the code buffer 106. The determination circuit 113 further supplies a subtraction request signal to the subtraction circuit 112 after interrupting the encoding or completing the encoding of one block.

The brought-forward-code-quantity subtraction circuit 112 receives the initial value of the brought forward code quantity from the microcomputer 150 and holds the initial value. The subtraction circuit 112 receives the positive or negative difference value from the difference detection circuit 111 and subtracts the difference value from the brought forward code quantity as requested by the subtraction request signal to generate a carried forward code quantity. When the difference value is positive, the difference value is subtracted from the brought forward code quantity and thereby, the brought forward code quantity is decreased. When the difference value is negative, it is added to the brought forward code quantity and thereby, the brought forward code quantity is updated and a carried forward code quantity is generated. Thus, the brought forward code quantity is updated after interrupting the encoding processing or completing the encoding of one block.

In the case of the first embodiment, when the total code quantity is less than the reference code quantity as the result of encoding of one block, a surplus code quantity is added to the brought forward code quantity. Encoding processing of the next block is continued until the total code quantity becomes substantially equal to an added code quantity which is the sum of the reference code quantity and the brought forward code quantity. In other words, when the total code quantity becomes substantially equal to an added code quantity, the encoding processing is interrupted. Therefore, the number of codes to be truncated due to interruption of encoding decreases though the total code quantity of the next block is relatively large. This prevents the quality of a reproduced screen from deteriorating.

Figure 5:
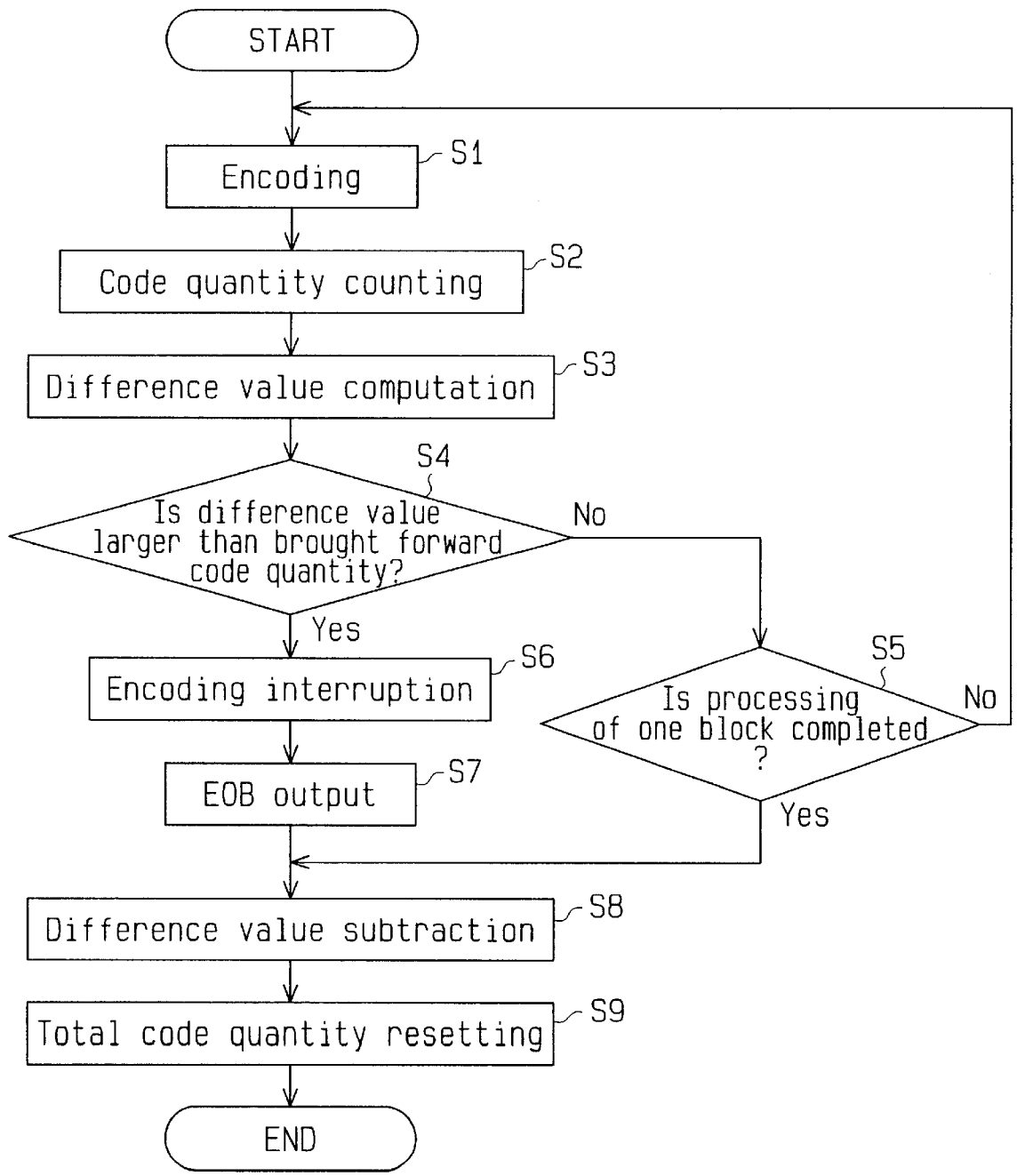
FIG. 5 is a flow chart showing operations of the image data encoding apparatus in FIG. 4.

Operations of an image data encoding apparatus are described below in accordance with the flow chart in FIG. 5. In step S1, the encoding circuit 103 encodes image data to generate compressed image data. In step S2, the code quantity counter 107 counts the number of codes of the compressed image data and accumulates the counted values. In step S3, the difference detection circuit 111 computes the difference value between the total code quantity of the compressed image data and a predetermined reference code quantity. In step S4, the comparison and determination circuit 113 compares the difference value with the brought forward code quantity. When the difference value is smaller than the brought forward code quantity, operation proceeds to step S5. On the other hand, when the difference value is larger than the brought forward code quantity, operation moves to step S6.

In step S5, it is determined whether encoding processing for the block is completed, based on the encoding state by the encoding circuit 103. When the encoding is not completed, step S1 is restarted. Alternatively, when the encoding is completed, operation proceeds to step S8 by skipping steps S6 and S7.

Encoding by the encoding circuit 103 is interrupted in step S6. Then, the EOB code is generated by the code output buffer 106 after output of code data is stopped in step S7.

In step S8, the brought forward code quantity subtraction circuit 112 subtracts the difference value from the brought forward code quantity to produce the carried forward code quantity. In step S9, the brought forward code quantity subtraction circuit 112 resets the counted value (total code quantity) of the code quantity counter 107 to complete the encoding process of the image data of one block.

The processings between steps S1 and S4 are repeated while the total code quantity is smaller than the reference code quantity during encoding process of the image data of a block. The operations of the encoding apparatus are completed by performing the processings in steps S8 and S9. Further, when the total code quantity exceeds the reference code quantity during the encoding process, operations of the encoding apparatus are interrupted and completed by performing the processings in steps S6, S7, S8 and S9.

When the total code quantity is smaller than the reference code quantity, a negative difference value is subtracted from the brought forward code quantity in step S8 and therefore the carried forward code quantity increases. On the contrary, when the former is larger than the latter, a positive difference value is subtracted from the carried forward code quantity and therefore the brought forward code quantity decreases.

Figure 6A:
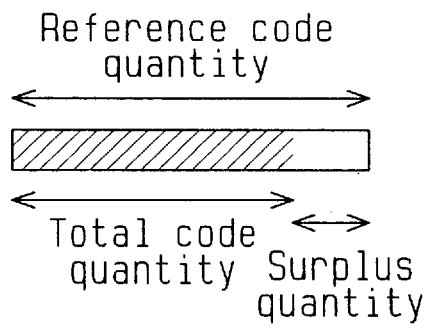
FIGS. 6A to 6C are diagrams showing the control of the code quantity of each block image data using a brought forward code quantity for each case.

For example, FIG. 6A shows a case in which the total code quantity of the compressed image data in a specific block is smaller than the reference code quantity. In this case, a surplus code quantity (the reference code quantity— the total code quantity) is added to the brought forward code quantity after the processing of one block is completed. Therefore, the increased carried forward code quantity is produced to determine the interruption of encoding process of the next block. This moderates the criterion for interruption of encoding process.

Figure 6B:
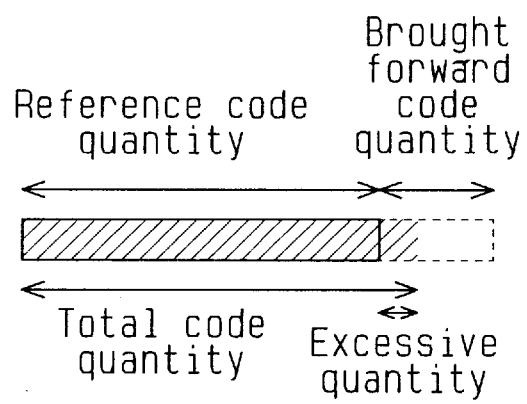

FIG. 6B shows a case in which the total code quantity is larger than the reference code quantity (the total code quantity is larger than the sum of the reference code quantity and the brought forward code quantity). In this case, an excessive code quantity (the total code quantity—the reference code quantity) is subtracted from the brought forward code quantity. The decreased carried forward code quantity is therefore produced to determine the interruption of encoding of the next block. This intensifies the criterion for interruption of encoding process.

Figure 6C:
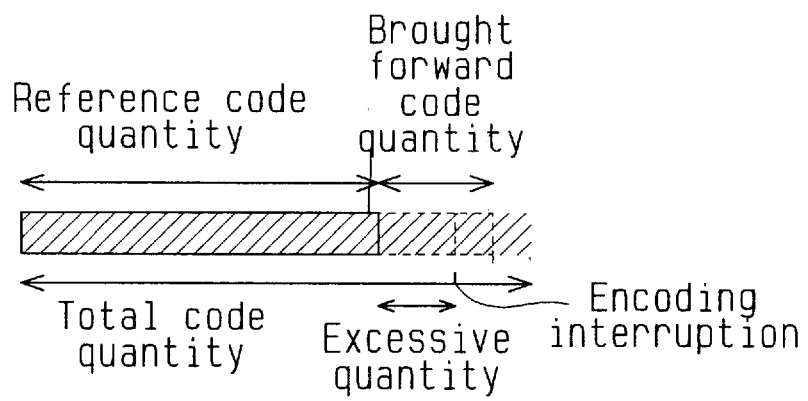

FIG. 6C shows a case in which the difference value between the total code quantity and the reference code quantity is larger than the brought forward code quantity. In this case, encoding process is interrupted so that the excessive code quantity of the total code quantity to the reference code quantity becomes smaller than the brought forward code quantity. At the time of interruption, the excessive code quantity of the total code quantity is subtracted from the brought forward code quantity. Therefore, the criterion for interruption of encoding process of the next block is intensified.

Thus, adaptively changing the criterion for interruption of encoding process by using the brought forward code quantity lowers the probability of occurrence of encoding interruption in each block. In other words, the brought forward code quantity is adaptively changed so that the probability of occurrence of interruption decreases. Determination of whether to interrupt encoding in accordance with the result of comparing the brought forward code quantity with the difference value, decreases the number of codes to be truncated due to interruption. In other words, even if encoding process is interrupted, an excessive code quantity less than the brought forward code quantity is outputted. Thus, deterioration of the quality of a reproduced image is minimized.

(Second Embodiment)

Figure 7:
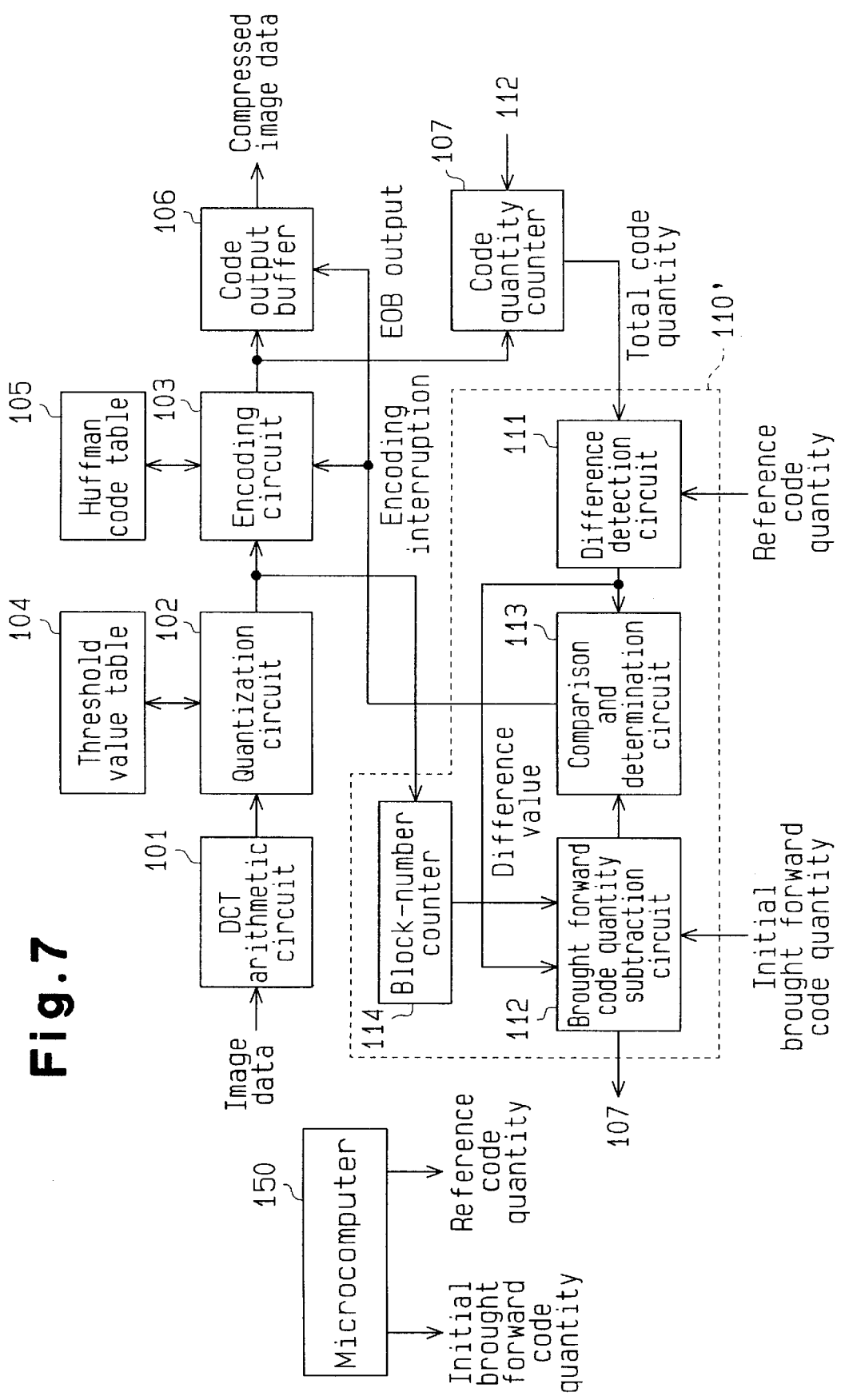
FIG. 7 is a block diagram showing an image data encoding apparatus according to a second embodiment of the present invention.

An image data encoding apparatus of the second embodiment of the present invention will be described below by referring to the accompanying drawings. To avoid a redundant description, like or same reference numerals are given to those components that are like or the same as the corresponding components of the first embodiment. As shown in FIG. 7, the image data encoding apparatus of the second embodiment includes a DCT arithmetic circuit 101, a quantization circuit 102, an encoding circuit 103, a threshold value table 104, a Huffman code table 105, a code buffer 106, a code quantity counter 107, and a code quantity control circuit 110'. The code quantity control circuit 110' has a block-number counter 114 in addition to the difference detection circuit 111, the brought forward code quantity subtraction circuit 112, and the comparison and determination circuit 113.

The block-number counter 114 receives quantized DCT coefficient data supplied from the quantization circuit 102 and counts the number of blocks to be supplied to the encoding circuit 103 in accordance with the DCT coefficient data. When the counted value of the block-number counter 114 reaches a predetermined value, the block-number counter 114 supplies a reset trigger signal for resetting the subtraction circuit 112 to the brought forward code quantity subtraction circuit 112. The brought forward code quantity subtraction circuit 112 initializes the brought forward code quantity in response to the reset trigger signal and further resets the counted value of the code quantity counter 107. In the case of the second embodiment, a predetermined count value is set to the number of blocks for one block row. Therefore, the control operation by the code quantity control circuit 110' is initialized for each block row. In other words, the control operation of the code quantity by the brought forward code quantity is carried out for each block row. This type of code quantity control decreases the difference between the brought forward code quantity used for a specific block in one screen and the brought forward code quantity used for an adjacent or remote block. Thereby, a relatively natural reproduced screen is obtained.

Figure 8:
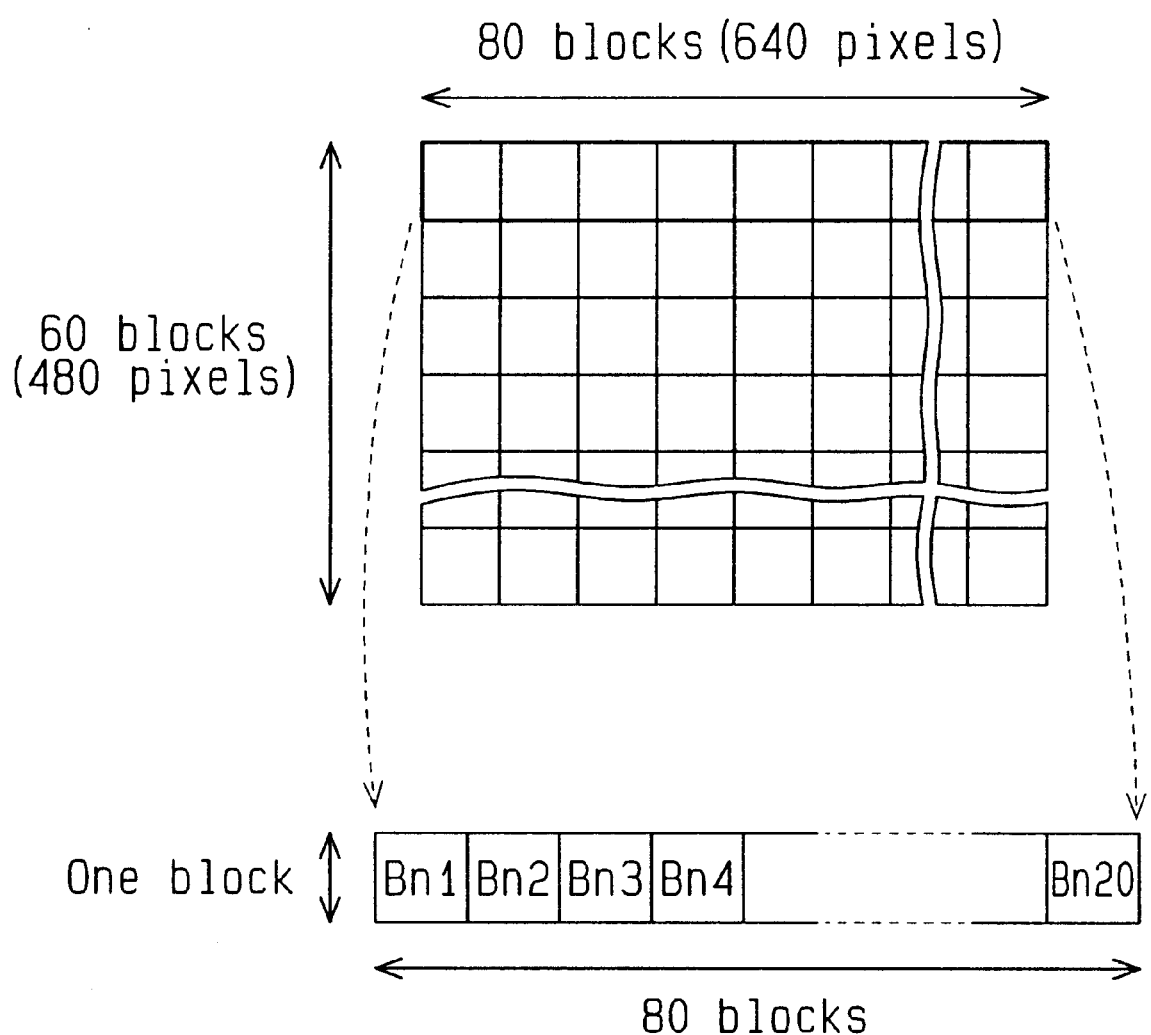
FIG. 8 is a diagram showing the unit of one block row in which the number of codes is controlled by the image data encoding apparatus in FIG. 7.

As shown in FIG. 8, for example, one screen corresponding to the VGA standard of computer units comprises 640×480 pixels. In the case of encoding process according to the JPEG algorithm, this one screen is divided into 80×60 blocks. The block-number counter 114 supplies a reset signal to the brought forward code quantity subtraction circuit 112 whenever it counts 80 blocks. Thus, the number of codes is controlled for a unit of each block row (80 blocks) by using the brought forward code quantity.

Initialization of the brought forward code quantity, that is, initialization of the control circuit 110' can be performed not only every block row but also every two or more block rows. For example, initialization can be performed every 1,600 blocks (80×20 block rows). This method makes it possible to control the number of codes of each area formed by dividing one screen into three areas.

As another example, the control circuit 110' can be constituted so that the temporal interval of initialization increases in a specific area in a screen, for example, the central area of the screen. In other words, the temporal interval of initialization may be variable. In this case, it is preferable that the control circuit 110' is constituted so that the control using the brought forward code quantity is enhanced for a specific area having a high significance in the screen quality. Specifically, the control circuit 110' includes a register connected to the brought forward code quantity subtraction circuit 112 to store a plurality of initial brought forward codes. The register selectively supplies a specific initial code quantity to the subtraction circuit 112 in response to a reset signal sent from the block-number counter 114. That is, the number of codes is controlled by using the initial brought forward code quantity having a relatively large value for a specific important area. In other words, the initial brought forward code quantity may be variable. However, it is preferable to set each initial brought forward code quantity by considering that the total code quantity in one screen must be kept at a predetermined value.

(Third Embodiment)

Figure 9:
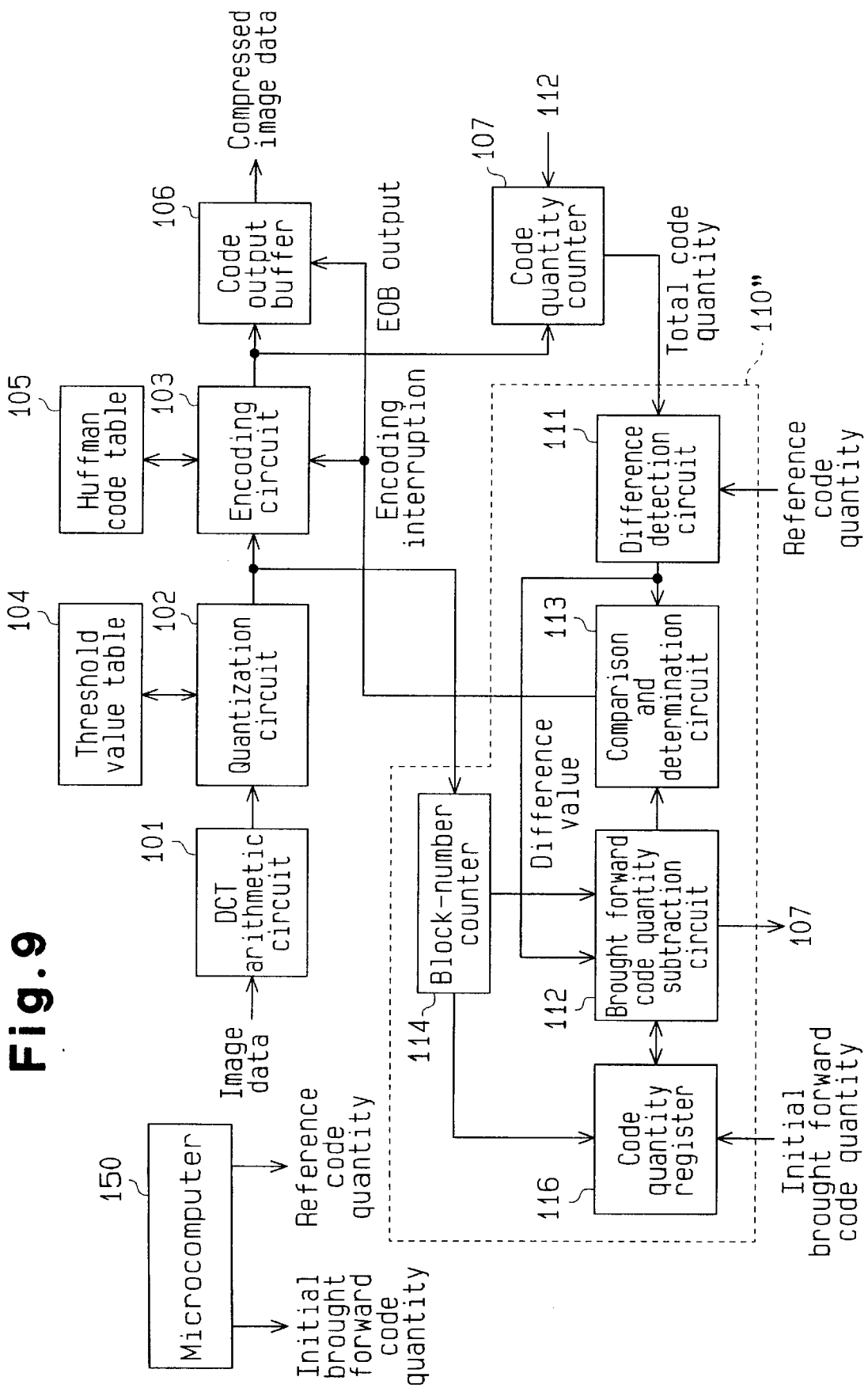
FIG. 9 is a block diagram showing an image data encoding apparatus according to a third embodiment of the present invention.

An image data encoding apparatus of the third embodiment of the present invention will be described below by referring to the accompanying drawings. To avoid a redundant description, like or same reference numerals are given to those components that are like or the same as the corresponding components of the first embodiment. As shown in FIG. 9, the image data encoding apparatus of the third embodiment includes a DCT arithmetic circuit 101, a quantization circuit 102, an encoding circuit 103, a threshold value table 104, a Huffman code table 105, a code buffer 106, a code quantity counter 107, and a code quantity control circuit 110". The code quantity control circuit 110" has a block-number counter 114 and a code quantity register 116 in addition to the difference detection circuit 111, the brought forward code quantity subtraction circuit 112, and the comparison and determination circuit 113.

The block-number counter 114 receives the quantized data supplied from the quantization circuit 102 and counts the number of blocks to be supplied to the encoding circuit 103. When the counted value of the counter 114 reaches a predetermined value, the brought forward code quantity is temporarily stored in the code quantity register 116 from the brought forward code quantity subtraction circuit 112. Then, the code quantity register 116 and the brought forward code quantity subtraction circuit 112 are controlled so that the brought forward code quantity or initial brought forward code quantity is supplied to the brought forward code quantity subtraction circuit 112.

The code quantity register 116 is connected to the brought forward code quantity subtraction circuit 112, first receives an initial brought forward code quantity, and temporarily stores the initial brought forward code quantity. The code quantity register 116 further supplies the initial brought forward code quantity to the brought forward code quantity subtraction circuit 112. The code quantity register 116 receives the brought forward code quantity from the brought forward code quantity subtraction circuit 112 in response to an instruction sent from the block-number counter 114 and temporarily stores the brought forward code quantity. The code quantity register 116 is constituted so as to store a predetermined number of brought forward code quantities, and to supply one brought forward code quantity to the brought forward code quantity subtraction circuit 112. The predetermined number of brought forward code quantities respectively corresponds to a plurality of areas divided in one screen. Therefore, according to the third embodiment, it is possible to control each area by using a corresponding brought forward code quantity.

Figure 10:
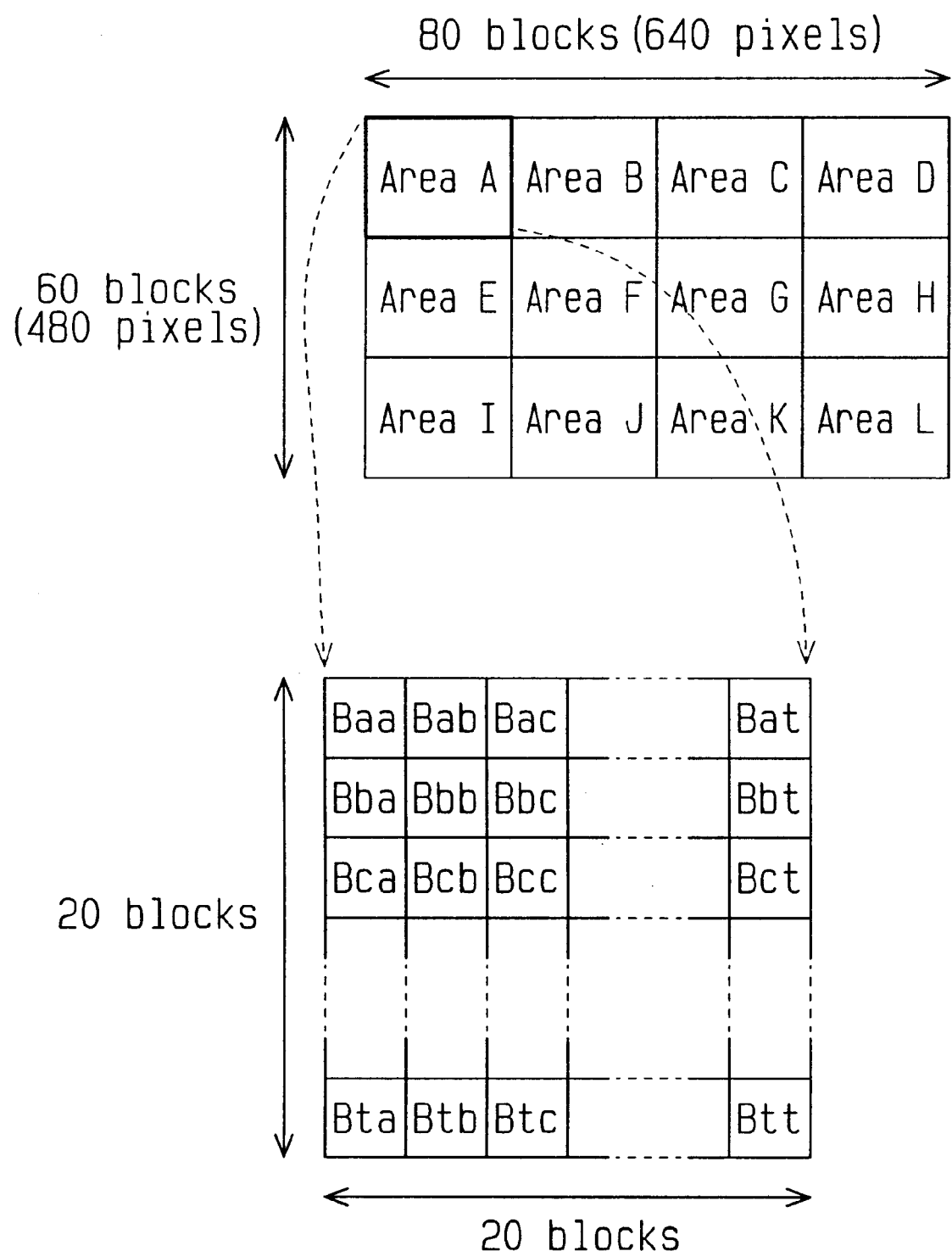
FIG. 10 is a diagram showing the unit of each divided area in which the number of codes is controlled by the image data encoding apparatus in FIG. 9.

As shown in FIG. 10, functions of the third embodiment are described below by using an example in which one screen is divided into 12 (4×3) areas (A to L). Each area comprises 400 (20×20) blocks. The code quantity register 116 stores four brought forward code quantities respectively corresponding to four horizontal areas. The code quantity of each area is controlled by using a corresponding brought forward code quantity.

The processing of a block Baa at the left top end (head of the first line) in one area is started when the initial brought forward code quantity is supplied from the code quantity register 116 to the brought forward code quantity subtraction circuit 112. The processing of each of blocks Bba to Bta at the left end (heads of 2nd to 20th lines) in one area is started when the brought forward code quantity corresponding to the area is supplied from the code quantity register 116 to the brought forward code quantity subtraction circuit 112. Whenever the processing of each of blocks Bat to Btt at the right end (tails of 1st to 20th lines) is completed, the brought forward code quantity is supplied from the brought forward code quantity subtraction circuit 112 to the register 116. The code quantity register 116 rewrites the brought forward code quantity used before for blocks Baa to Bta at the left end to the newly supplied brought forward code quantity.

When the processing of block Btt at the right bottom (tail of 20th line) is completed, the brought forward code quantity stored in the code quantity register 116 is cleared. The processing of the next area is started when the initial brought forward code quantity is supplied from the code quantity register 116 to the brought forward code quantity subtraction circuit 112. Thus, the code quantity is controlled by using a brought forward code quantity in each area. This type of code quantity control decreases the difference between the brought forward code quantity used for a specific area in one screen and the brought forward code quantity used around the area or used for a remote area.

In the case of the third embodiment, it is permitted to set an area to an optional size. In other words, it is unnecessary that each area has the same size. In this case, the block-number counter 114 is constituted so that the reset timing and supply timing of the brought forward code quantity change in accordance with the size of each area. As another example, it is permitted that initial brought forward code quantity is set for each area. In this case, the image quality of a reproduced screen is improved by concentratedly using a plurality of initial brought forward code quantities at a plurality of areas defined in the central portion of a screen. The central portion has a relatively high significance in image quality. Specifically, the code quantity register 116 stores a plurality of initial brought forward code quantities and selectively supplies a specific initial brought forward code quantity to the brought forward code quantity subtraction circuit 112 in response to a reset instruction sent from the block-number counter 114.

(Fourth Embodiment)

Figure 11:
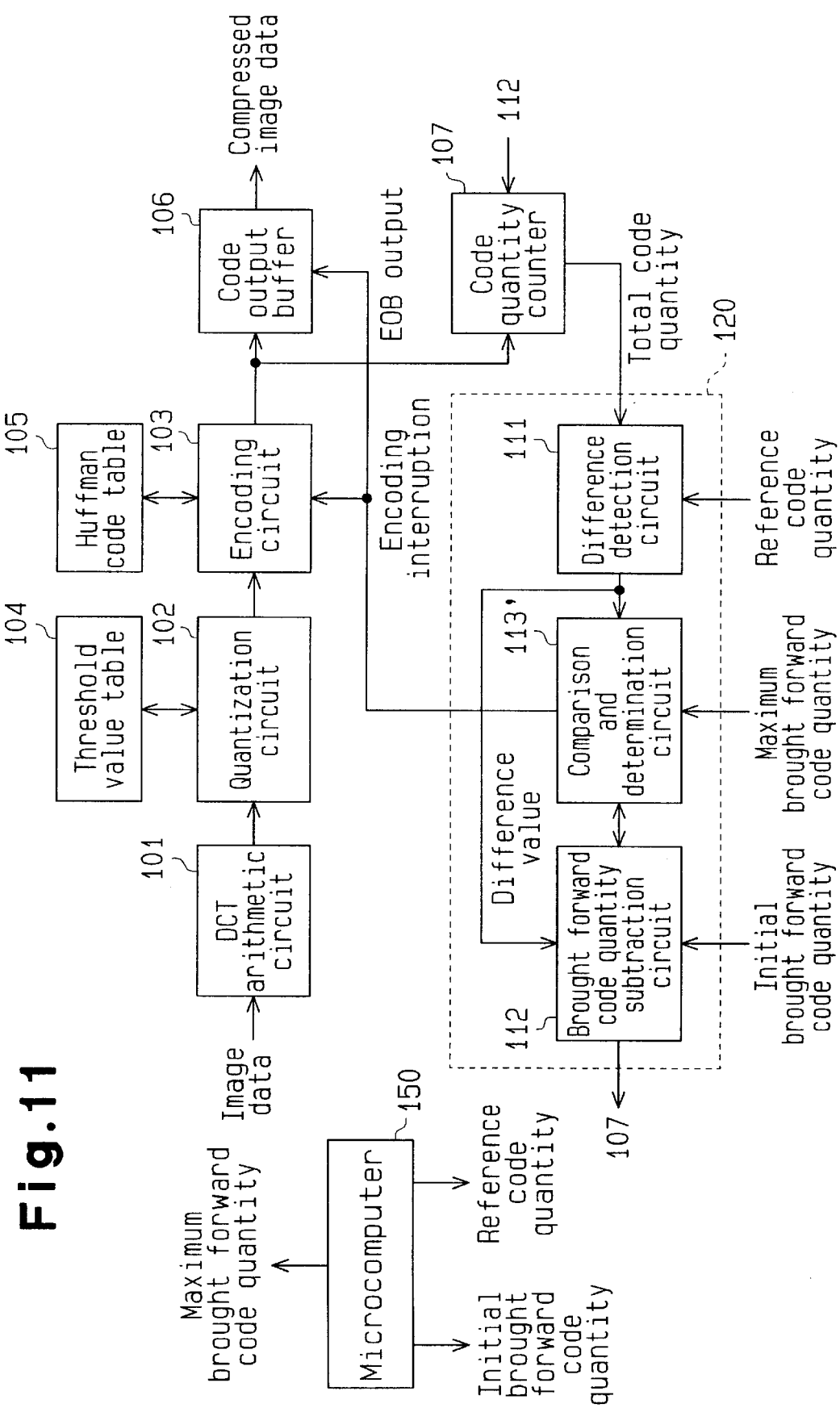
FIG. 11 is a block diagram showing an image data encoding apparatus according to a fourth embodiment of the present invention.

An image data encoding apparatus of the fourth embodiment of the present invention will be described below by referring to the accompanying drawings. To avoid a redundant description, like or same reference numerals are given to those components that are like or the same as the corresponding components of the first embodiment. As shown in FIG. 11, the image data encoding apparatus of the fourth embodiment includes a code quantity control circuit 120 having a comparison and determination circuit 113' different from that of the first embodiment.

The comparison and determination circuit 113' of the fourth embodiment supplies an encoding interruption signal and an EOB output signal to the encoding circuit 103 and code buffer 106 respectively when the difference value between the total code quantity and the reference code quantity exceeds the brought forward code quantity. The determination circuit 113' further receives a predetermined maximum brought forward code quantity from the microcomputer 150 and compares the maximum brought forward code quantity with the present brought forward code quantity. The determination circuit 113' supplies an encoding interruption signal and an EOB output signal even if the difference value is less than the present brought forward code quantity when the present brought forward code quantity exceeds the maximum brought forward code quantity in accordance with the comparison result. In the case of the fourth embodiment, since the brought forward code quantity is limited to a predetermined value, the difference between the brought forward code quantity to a specific block and the brought forward code quantity to a block around the specific block decreases. This operates to improve the image quality.

Figure 12:
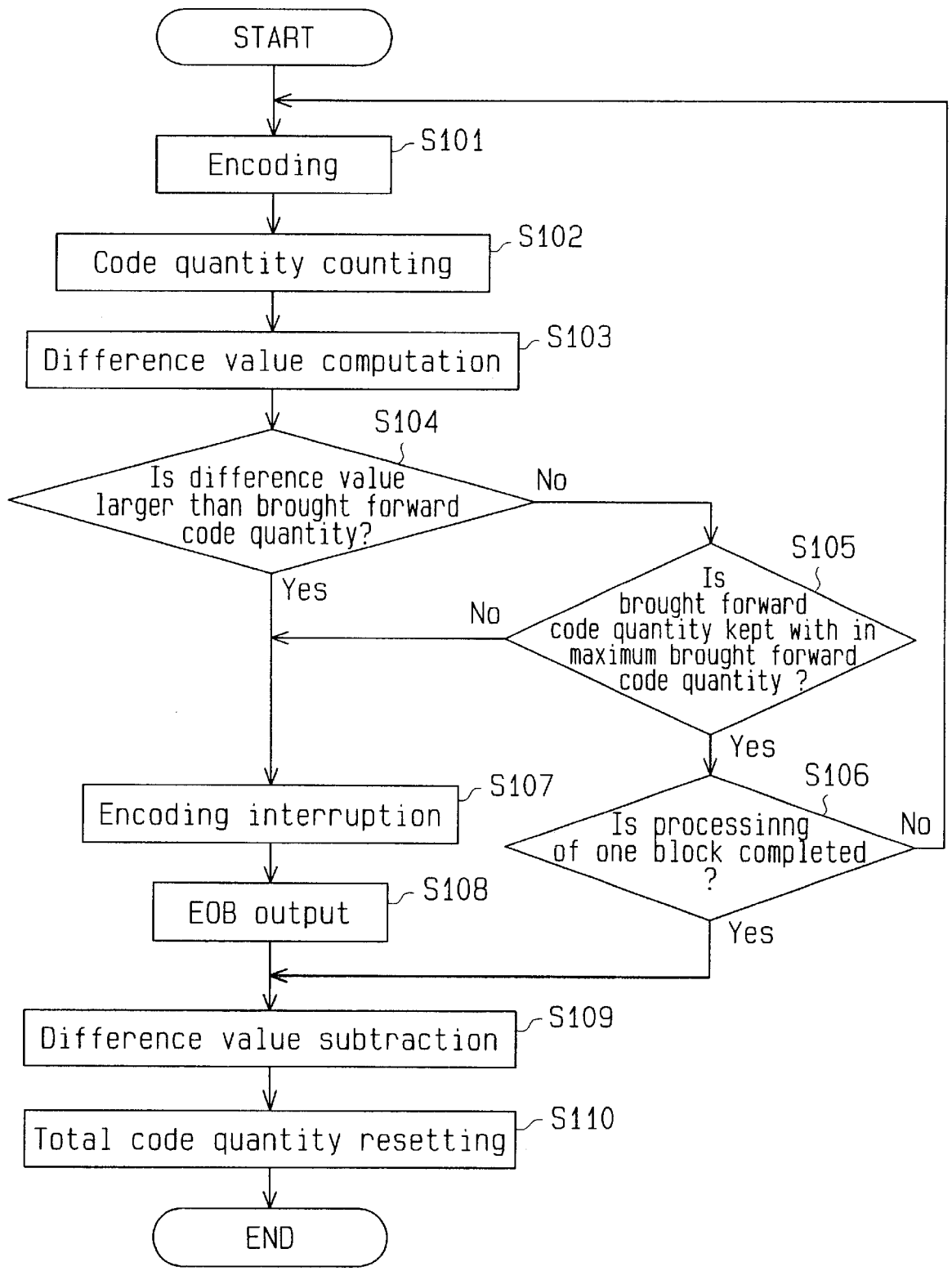
FIG. 12 is a flow chart showing operations of the image data encoding apparatus in FIG. 11.

FIG. 12 is a flow chart showing operations of the image data encoding apparatus of the fourth embodiment. Steps S101, S102, S103, S104, S106, S107, S108, S109, and S110 in FIG. 12 respectively correspond to steps S1, S2, S3, S4, S5, S6, S7, S8, and S9 in FIG. 5. Therefore, the detailed description of these steps is omitted. The additional step S105 is, however, described below.

When the difference value is smaller than the brought forward code quantity in step S104, step S105 is started. Alternatively, when the difference value is larger than the brought forward code quantity in step S104, operation proceeds to step S107. In step S105, the comparison and determination circuit 113' compares the present brought forward code quantity with a predetermined maximum brought forward code quantity. When the present brought forward code quantity is equal to or less than the maximum brought forward code quantity, operation proceeds to step S106. However, when the present brought forward code quantity exceeds the maximum brought forward code quantity, operation moves to step S107.

In the case of the fourth embodiment, operations between steps S101 and S105 are repeated while the difference value does not exceed the brought forward code quantity and the brought forward code quantity does not exceed the maximum brought forward code quantity. Thereafter, operations of the encoding apparatus are completed by performing the processings in steps S109 and S110.

Figure 13A:
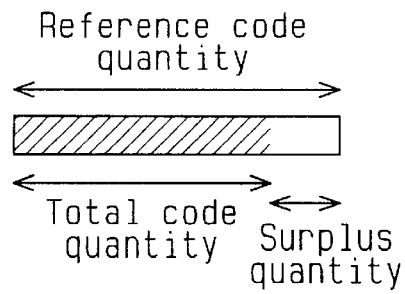
FIGS. 13A to 13E are diagrams showing the control of the number of codes of each block image data using a brought forward code quantity for each case.
Figure 13B:
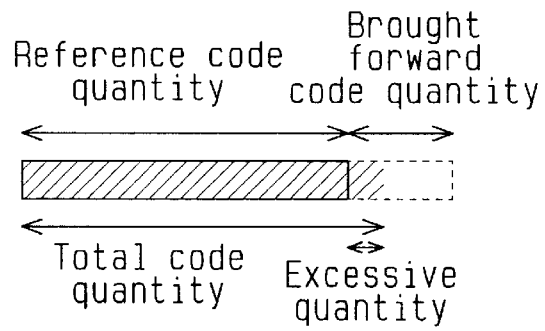
Figure 13C:
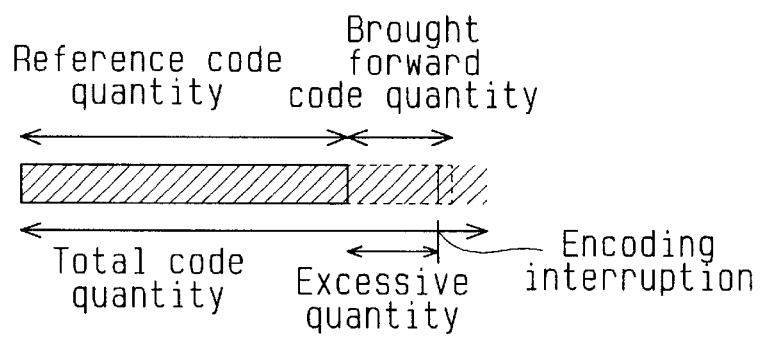

FIG. 13A shows a case where the total code quantity of compressed image data in a specific block is smaller than the reference code quantity similarly to FIG. 6A. FIG. 13B shows a case where the total code quantity is larger than the reference code quantity similarly to FIG. 6B. FIG. 13C shows a case where the total code quantity is larger than the sum of the reference code quantity and the brought forward code quantity similarly to FIG. 6C. In the above cases, the same processing as that of the first embodiment is performed.

Figure 13D:
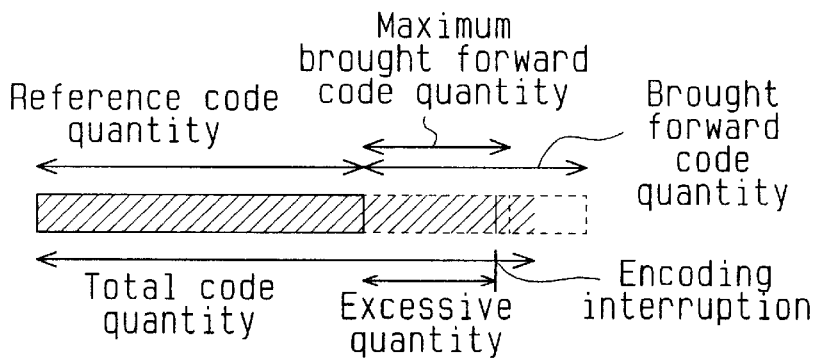

FIG. 13D shows a case where the brought forward code quantity is larger than the maximum brought forward code quantity. In this case, encoding is interrupted even if the total code quantity is smaller than the sum of the reference code quantity and the brought forward code quantity. To describe in detail, encoding processing is interrupted so that the total code quantity becomes smaller than the sum of the reference code quantity and the maximum brought forward code quantity. In other words, encoding processing is interrupted so that the excessive quantity of the total code quantity becomes smaller than the maximum brought forward code quantity.

Figure 13E:
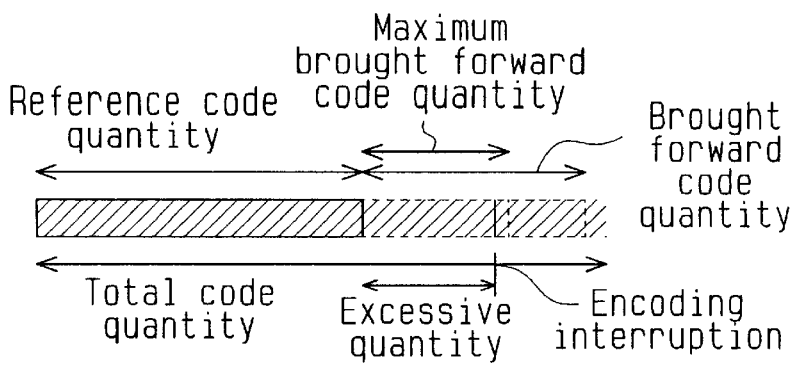

FIG. 13E shows a case where the total code quantity is larger than the sum of the reference code quantity and the brought forward code quantity. In this case, encoding processing is interrupted so that the excessive code quantity becomes smaller than the maximum brought forward code quantity.

(Fifth Embodiment)

Figure 14:
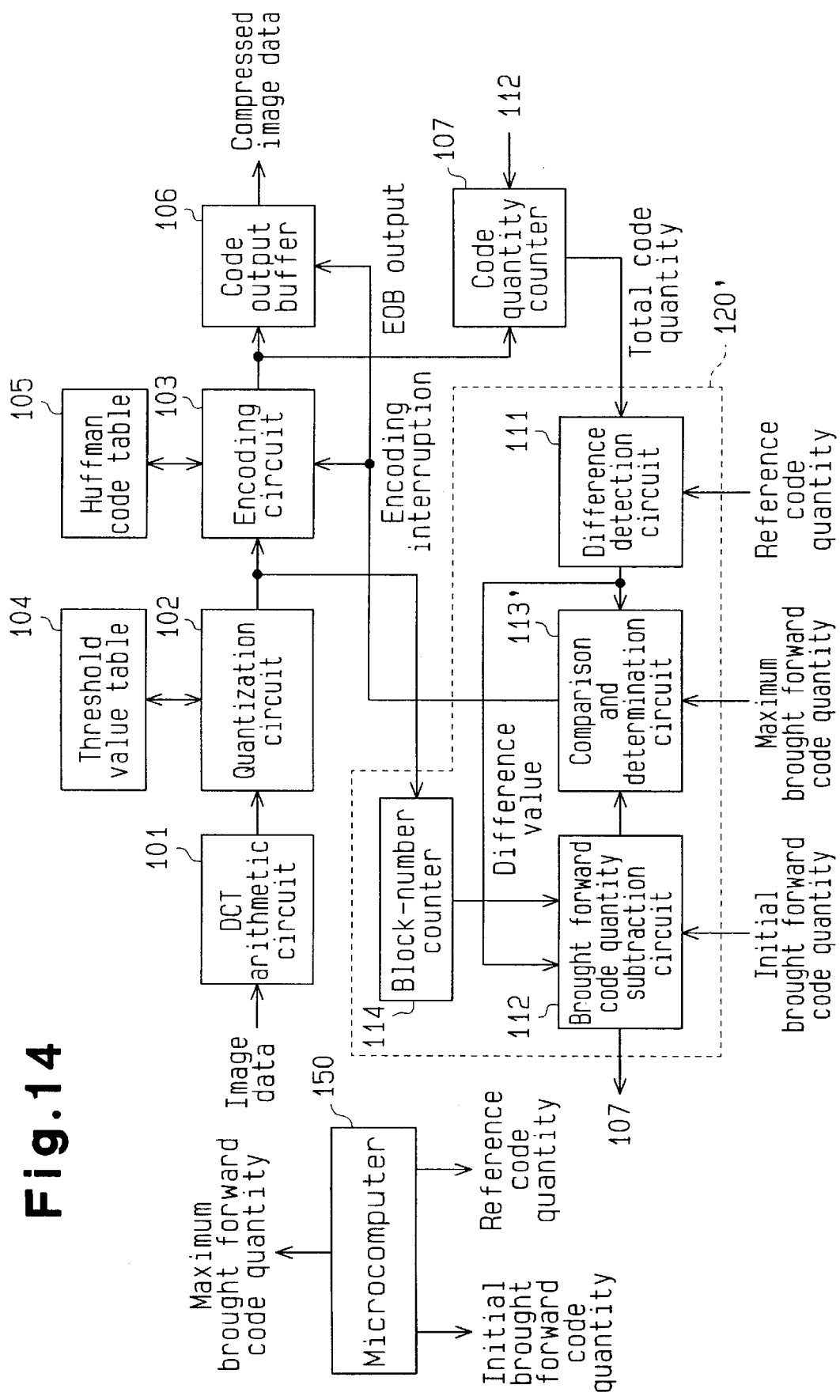
FIG. 14 is a block diagram showing an image data encoding apparatus according to a fifth embodiment of the present invention.

As shown in FIG. 14, an image data encoding apparatus of the fifth embodiment of the present invention is constituted by combining the second embodiment shown in FIG. 7 with the fourth embodiment shown in FIG. 11. That is, the image data encoding apparatus of the fifth embodiment includes a code quantity control circuit 120' having the comparison and determination circuit 113' of the fourth embodiment instead of the comparison and determination circuit 113 of the code quantity control circuit 110' of the second embodiment.

(Sixth Embodiment)

Figure 15:
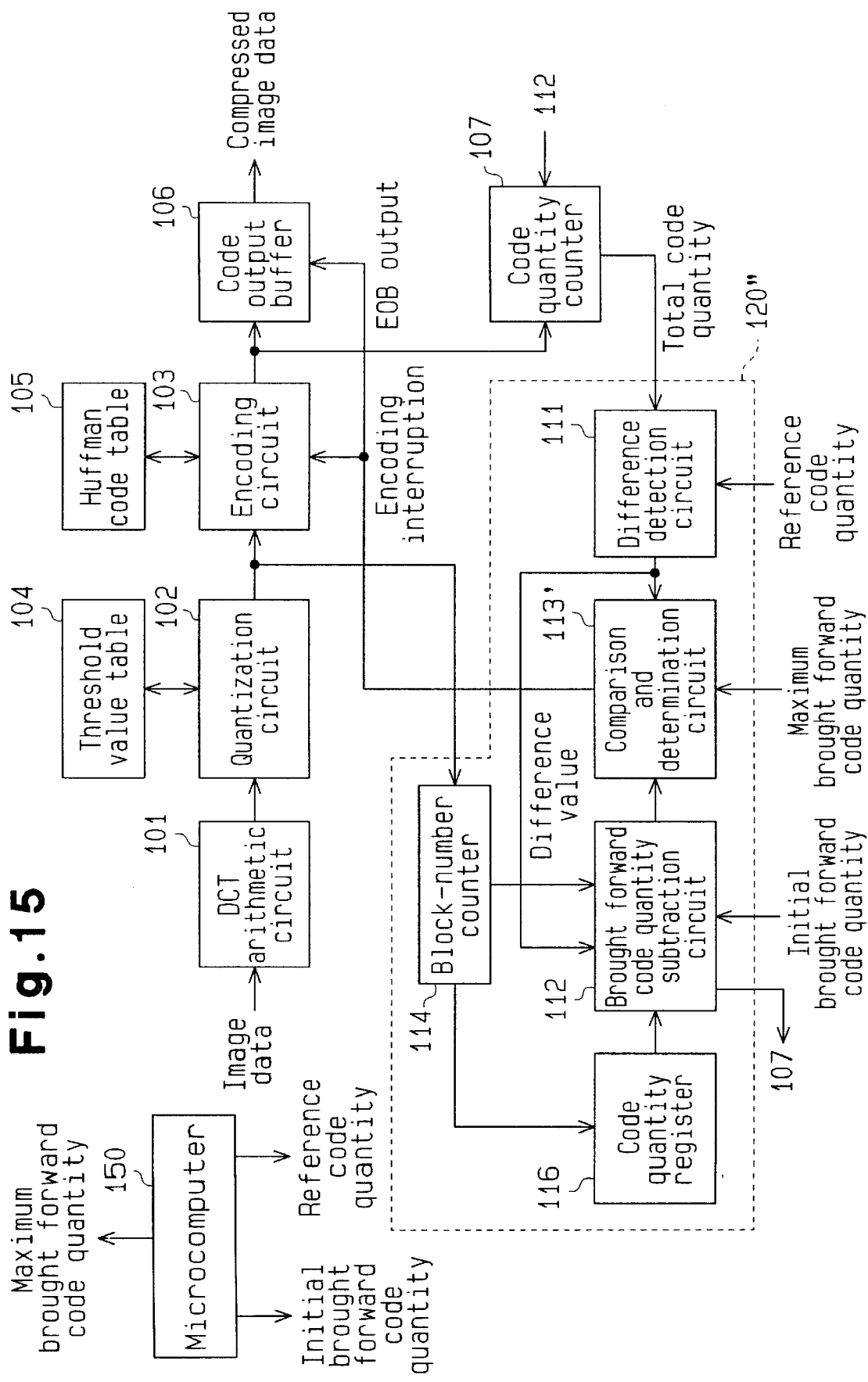
FIG. 15 is a block diagram showing an image data encoding apparatus according to a sixth embodiment of the present invention.

As shown in FIG. 15, an image data encoding apparatus of the sixth embodiment of the present invention is constituted by combining the third embodiment shown in FIG. 9 with the fourth embodiment shown in FIG. 11. That is, the image data encoding apparatus of the sixth embodiment includes a code quantity control circuit 120" having the comparison and determination circuit 113' of the fourth embodiment instead of the comparison and determination circuit 113 of the code quantity control circuit 110" of the third embodiment.

(Seventh Embodiment)

Figure 16:
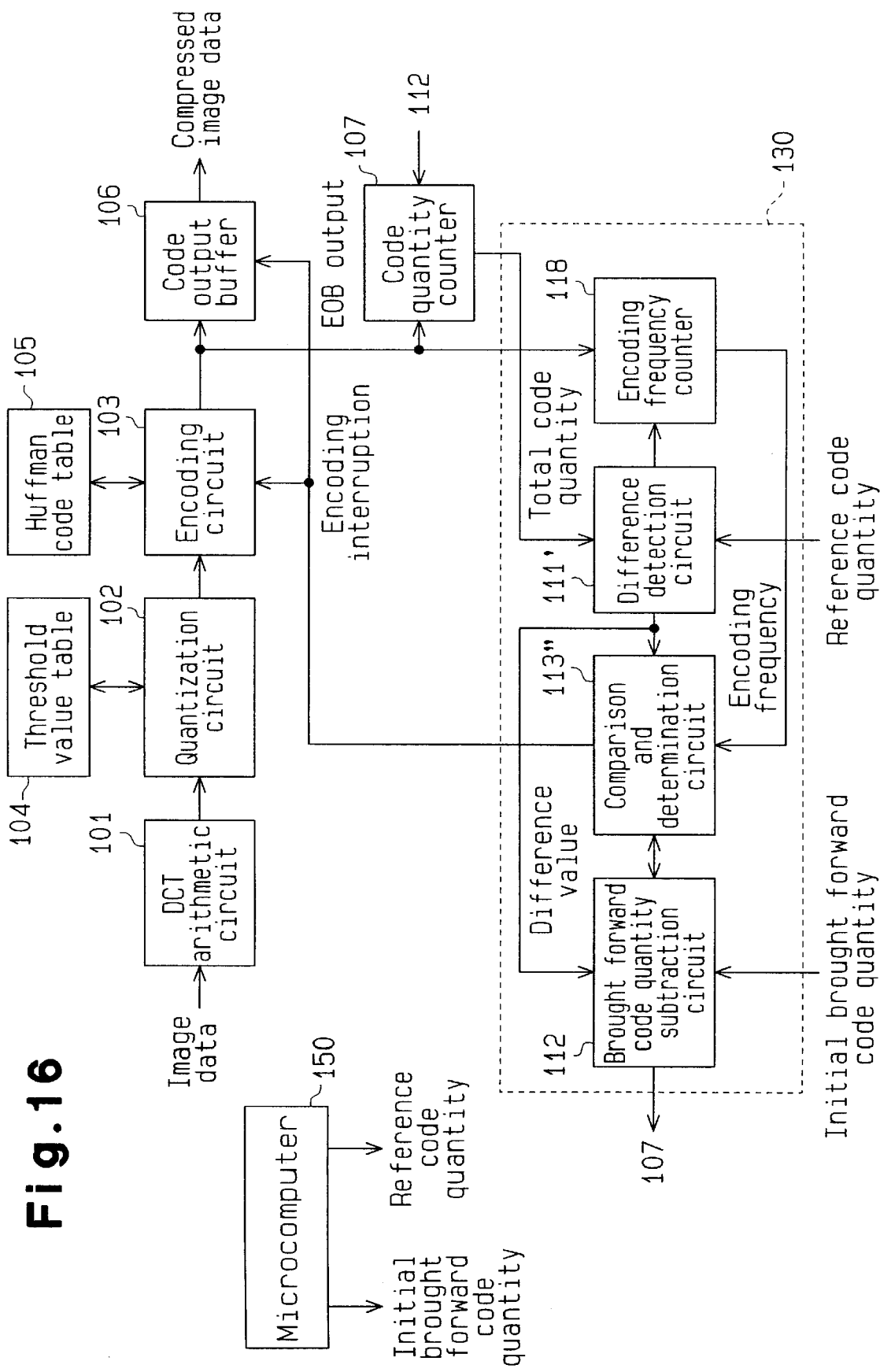
FIG. 16 is a block diagram showing an image data encoding apparatus according to a seventh embodiment of the present invention.

An image data encoding apparatus of the seventh embodiment of the present invention will be described below by referring to the accompanying drawings. To avoid a redundant description, like or same reference numerals are given to those components that are like or the same as the corresponding components of the first embodiment. As shown in FIG. 16, the image data encoding apparatus of the seventh embodiment includes an encoding frequency counter 118 and a code quantity control circuit 110 having a comparison and determination circuit 113" and difference detection circuit 111' both of which are different from those of the first embodiment.

The difference detection circuit 111' computes the difference between the reference code quantity and the total code quantity. The difference detection circuit 111' outputs a negative difference value when the total code quantity is smaller than the reference code quantity and a positive difference value when the former is larger than the latter. The difference detection circuit 111' further supplies a signal representing a start instruction to start counting to the encoding frequency counter 118 when the difference value becomes larger than 0 (when the total code quantity exceeds the reference code quantity).

The encoding frequency counter 118 starts counting the encoding frequency of the encoding circuit 103 in accordance with the instruction sent from the difference detection circuit 111' after the total code quantity exceeds the reference code quantity. The counter 118 supplies the counted value representing an encoding frequency to the comparison and determination circuit 113".

The comparison and determination circuit 113" supplies an encoding interruption signal and an EOB output signal when the difference value between the total code quantity and the reference code quantity exceeds the brought forward code quantity. The comparison and determination circuit 113" further receives a counted value from the encoding frequency counter 118. When the counted value reaches a predetermined value, the circuit 113" instructs the encoding circuit 103 and code buffer 106 to interrupt encoding and output an EOB code regardless of the difference value.

In the seventh embodiment, encoding processings up to a predetermined specified number of times are permitted after the total code quantity exceeds the reference code quantity. This type of control of encoding processing according to the encoding frequency limits the brought forward code quantity to a certain upper limit value. The certain upper limit changes in accordance with a state of the encoding process. This limitation of the brought forward code quantity decreases the difference between the brought forward code quantity for a specific block and the brought forward code quantity for a block around the specific block.

Figure 17:
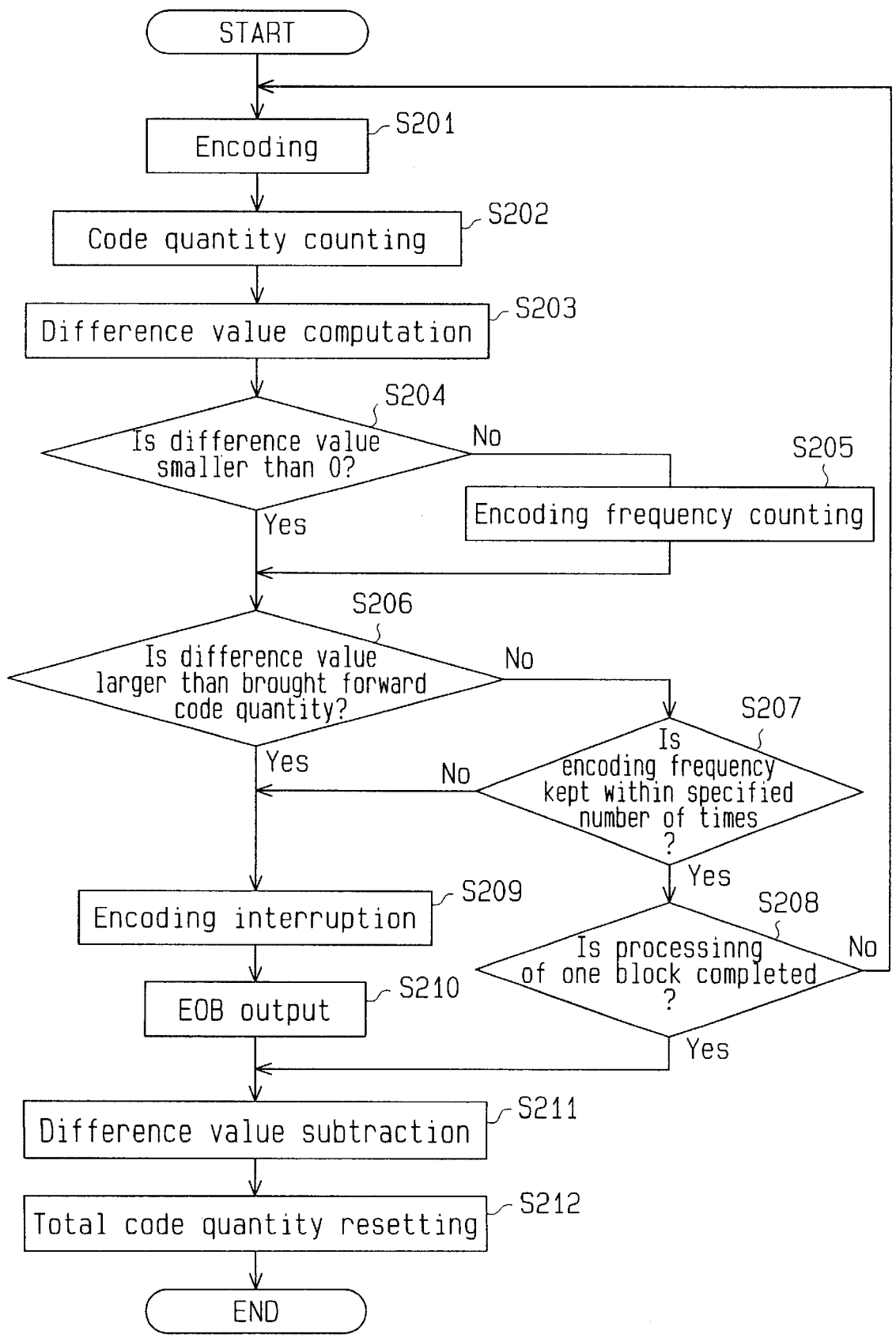
FIG. 17 is a flow chart showing operations of the image data encoding apparatus in FIG. 16.

FIG. 17 is a flow chart showing operations of the image data encoding apparatus of the seventh embodiment. Steps S201, S202, S203, S206, S208, S209, S210, S211, and S212 in FIG. 17 respectively correspond to steps S1, S2, S3, S4, S5, S6, S7, S8, and S9 in FIG. 5. Therefore, detailed description of these steps is omitted. The additional steps S204, S205, and S207 are mainly described below.

In step S204, following step S203, the total code quantity is compared with the reference code quantity and it is determined whether the difference value is negative. When the difference value is φ or positive (when the total code quantity reaches or exceeds the reference code quantity), operation proceeds to step S205. When the difference value is negative (when the total code quantity does not reach the reference code quantity), operation moves to step S206. In step S205, the encoding frequency counter 113 starts counting and the operation proceeds to step S206.

In step S206, the difference value is compared with the brought forward code quantity. When the difference value is smaller than the brought forward code quantity, operation proceeds to step S207. When the former is larger than the latter, the operation proceeds to step S209. In step S207, the comparison and determination circuit 113" judges whether the encoding frequency is kept within a specified number of times in accordance with the counted value of the encoding frequency counter 118 after the total code quantity exceeds the reference code quantity. When the encoding frequency is kept within the specified number of times, operation proceeds to step S208. When the encoding frequency exceeds the specified number of times, operation proceeds to step S209.

In the seventh embodiment, the processings between steps S201 and S208 are repeated while the difference value is kept at the brought forward code quantity or less and the encoding frequency is less than a specified number of times after the total code quantity exceeds the reference code quantity. Thereafter, operations of the encoding apparatus are completed by performing the processings in steps S211 and S212.

FIG. 18A shows a case where the total code quantity of the compressed image data in a specific block is smaller than the reference code quantity, similarly to FIGS. 6A and 13A. FIG. 18B shows a case where the total code quantity is larger than the reference code quantity, similarly to FIGS. 6B and 13B. FIG. 18C shows a case where the total code quantity is larger than the sum of the reference code quantity and the brought forward code quantity, similarly to FIGS. 18C and 6C. In the above cases, the same processing as that of the first embodiment is performed.

FIG. 18D shows a case where the total code quantity exceeds the reference code quantity and thereafter the encoding frequency exceeds a specified number of times. In this case, encoding processing is interrupted even if the total code quantity is smaller then the sum of the reference code quantity and the brought forward code quantity. In other words, the encoding frequency is limited to a specified number of times even if the excessive quantity is less than the brought forward code quantity after the total code quantity exceeds the reference code quantity.

(Eighth Embodiment)

As shown in FIG. 19, an image data encoding apparatus of the eighth embodiment of the present invention is constituted by combining the second embodiment shown in FIG. 7 with the seventh embodiment shown in FIG. 16. That is, the image data encoding apparatus of the eighth embodiment includes a code quantity control circuit 130' having the difference detection circuit 111' and comparison and determination circuit 113" of the seventh embodiment instead of the difference detection circuit 111 and comparison and determination circuit 113 in the code quantity control circuit 110' of the second embodiment.

(Ninth Embodiment)

As shown in FIG. 20, an image data encoding apparatus of the ninth embodiment of the present invention is constituted by combining the third embodiment shown in FIG. 9 with the seventh embodiment shown in FIG. 16. That is, the image data encoding apparatus of the ninth embodiment includes a code quantity control circuit 130" having the difference detection circuit 111' and comparison and determination circuit 113" of the seventh embodiment instead of the difference detection circuit 111 and comparison and determination circuit 113 in the code quantity control circuit 110" of the third embodiment.

Although several embodiments of the present invention have been described herein, it should be apparent to those skilled in the art that the present invention may be embodied in many other specific forms without departing from the spirit or scope of the invention. Particularly, it should be understood that the invention may be embodied in the following forms.

The reference code quantity can be set to a value particular to each block. Therefore, an image data encoding apparatus is provided with a register connected to the difference detection circuit 111 and storing a plurality of reference code quantities. An image data encoding apparatus is constituted so that the reference code quantity corresponding to each block is selectively read out of a register and supplied to the difference detection circuit 111.

Therefore, the present examples and embodiments are to be considered as illustrative and not restrictive and the invention is not to be limited to the details given herein, but may be modified within the scope and equivalence of the appended claims.

What is claimed is:

1. An apparatus for encoding image data of one screen separated into a plurality of blocks and generating coded image data, said image data being encoded in each block, said apparatus comprising:

an encoding circuit for encoding image data of each block in accordance with a predetermined algorithm to generate coded image data;

a code quantity counter, connected to said encoding circuit, for counting the number of codes of said coded image data and accumulating a counted value to generate a total code quantity of the coded image data of a block; and a control circuit, connected to said encoding circuit and said code quantity counter, for receiving said total code quantity and controlling an operation of said encoding circuit in accordance with a check result of said total code quantity using a reference code quantity and a brought forward code quantity, wherein said control circuit compares said total code quantity with said reference code quantity, and when said total code quantity exceeds said reference code quantity, said control circuit further compares an excessive quantity by which said total code quantity exceeds said reference code quantity with said brought forward code quantity, and instructs an interruption of generation of said coded image data by said encoding circuit when said excessive quantity is larger than said brought forward code quantity.

2. The apparatus according to claim 1, wherein said control circuit generates a carried forward code quantity by subtracting said excessive quantity from said brought forward code quantity when said total code quantity exceeds said reference code quantity, or adding a surplus quantity to said brought forward code quantity when said total code quantity is smaller than said reference code quantity.

3. The apparatus according to claim 1 further comprising a buffer, connected to said encoding circuit and said control circuit, for temporarily storing and supplying said coded image data, said buffer outputting a signal indicating that encoding processing of the image data of one block is over instead of the output of said coded image data in response to the instructed interruption of generation of said coded image data from said control circuit.

4. The apparatus according to claim 1, wherein said control circuit includes:

a difference detection circuit, connected to said code quantity counter, for detecting a difference value between said total code quantity and said reference code quantity, a comparison circuit, connected to said difference detection circuit, for comparing the difference value with said brought forward code quantity and instructing an interruption of generation of said coded image data by said encoding circuit when said difference value is larger than said brought forward code quantity; and a subtraction circuit, connected to said difference detection circuit and said comparison circuit, for generating a carried forward code quantity by subtracting said difference value from said brought forward code quantity and supplying said carried forward code quantity to said comparison circuit.

5. The apparatus according to claim 4, wherein said control circuit further includes a block-number counter, connected to said subtraction circuit, for counting the number of blocks of the image data supplied to said encoding circuit and generating a reset trigger each time the counted number reaches to a predetermined value, and wherein said subtraction circuit initializes said brought forward code quantity in response to said reset trigger and supplies said initialized brought forward code quantity to said comparison circuit.

6. The apparatus according to claim 5, wherein one screen is divided into a plurality of areas, each area includes a plurality of blocks, initial values of a plurality of brought forward code quantities are set to a plurality of areas respectively, and said control circuit further includes a register, connected to said subtraction circuit, for temporarily storing the initial values of said brought forward code quantities and selectively supplying the initial value of the brought forward code quantity corresponding to the area associated with a block presently being encoded.

7. An apparatus for encoding image data of one screen separated into a plurality of blocks and generating coded image data, said image data being encoded in each block, said apparatus comprising:

an encoding circuit for encoding image data of each block in accordance with a predetermined algorithm to generate coded image data;

a code quantity counter, connected to said encoding circuit, for counting the number of codes of said coded image data and accumulating a counted value to generate a total code quantity of the coded image data of a block; and a control circuit, connected to said encoding circuit and said code quantity counter, for receiving said total code quantity and controlling an operation of said encoding circuit in accordance with a check result of said total code quantity using a reference code quantity and a brought forward code quantity which includes a variable brought forward code quantity and a fixed brought forward code quantity, wherein said control circuit compares said total code quantity with said reference code quantity, and when said total code quantity exceeds said reference code quantity, said control circuit further compares an excessive quantity by which said total code quantity exceeds said reference code quantity with said variable brought forward code quantity, and instructs an interruption of generation of said coded image data by said encoding circuit when said excessive quantity is larger than said variable brought forward code quantity, and said control circuit compares said variable brought forward code quantity with said fixed brought forward code quantity, and instructs an interruption of generation of said coded image data by said encoding circuit when said variable brought forward code quantity exceeds said fixed brought forward code quantity.

8. The apparatus according to claim 7, wherein said control circuit generates a variable carried forward code quantity by subtracting said excessive quantity from said variable brought forward code quantity when said total code quantity exceeds said reference code quantity, or by adding a surplus quantity to said variable brought forward code quantity when said total code quantity is smaller than said reference code quantity.

9. The apparatus according to claim 7 further comprising a buffer, connected to said encoding circuit and said control circuit, for temporarily storing and supplying said coded image data, said buffer outputting a signal indicating that encoding processing of the image data of one block is over instead of the output of said coded image data in response to the instructed interruption of generation of said coded image data from said control circuit.

10. The apparatus according to claim 7, wherein said control circuit includes:

a difference detection circuit, connected to said code quantity counter, for detecting a difference value between said total code quantity and said reference code quantity, a comparison circuit, connected to said difference detection circuit, for comparing the difference value with said variable brought forward code quantity and instructing an interruption of generation of said coded image data by said encoding circuit when said difference value is larger than said variable brought forward code quantity, said comparison circuit further comparing said variable brought forward code quantity and said fixed brought forward code quantity and instructing an interruption of generation of said coded image data by said encoding circuit when said variable brought forward code quantity exceeds said fixed brought forward code quantity; and a subtraction circuit, connected to said difference detection circuit and said comparison circuit, for generating a variable carried forward code quantity by subtracting said difference value from said variable brought forward code quantity and supplying said variable carried forward code quantity to said comparison circuit.

11. The apparatus according to claim 10, wherein said control circuit further includes a block-number counter, connected to said subtraction circuit, for counting the number of blocks of the image data supplied to said encoding circuit and generating a reset trigger each time the counted number reaches to a predetermined value, and wherein said subtraction circuit initializes said variable brought forward code quantity in response to said reset trigger and supplies said initialized variable brought forward code quantity to said comparison circuit.

12. The apparatus according to claim 11, wherein one screen is divided into a plurality of areas, each area includes a plurality of blocks, initial values of a plurality of variable brought forward code quantities are set to a plurality of areas respectively, and said control circuit further includes a register, connected to said subtraction circuit, for temporarily storing the initial values of said variable brought forward code quantities and selectively supplying the initial value of the variable brought forward code quantity corresponding to the area associated with a block presently being encoded.

13. An apparatus for encoding image data of one screen separated into a plurality of blocks and generating coded image data, said image data being encoded in each block, said apparatus comprising:

an encoding circuit for encoding image data of each block in accordance with a predetermined algorithm to generate coded image data;

a code quantity counter, connected to said encoding circuit, for counting the number of codes of said coded image data and accumulating a counted value to generate a total code quantity of the coded image data of a block; and a control circuit, connected to said encoding circuit and said code quantity counter, for receiving said total code quantity and controlling an operation of said encoding circuit in accordance with a check result of said total code quantity using a reference code quantity and a brought forward code quantity, wherein said control circuit compares said total code quantity with said reference code quantity, and when said total code quantity exceeds said reference code quantity, said control circuit further compares an excessive quantity by which said total code quantity exceeds said reference code quantity with said brought forward code quantity, and instructs an interruption of generation of said coded image data by said encoding circuit when said excessive quantity is larger than said brought forward code quantity, and further after said total code quantity exceeds said reference code quantity, said control circuit counts an encoding number of times of said encoding circuit and instructs an interruption of generation of said coded image data by said encoding circuit when the encoded number of times count reaches a predetermined value.

14. The apparatus according to claim 13, wherein said control circuit generates a carried forward code quantity by subtracting said excessive quantity from said brought forward code quantity when said total code quantity exceeds said reference code quantity, or adding a surplus quantity to said brought forward code quantity when said total code quantity is smaller than said reference code quantity.

15. The apparatus according to claim 13 further comprising a buffer, connected to said encoding circuit and said control circuit, for temporarily storing and supplying said coded image data, said buffer outputting a signal indicating that encoding processing of the image data of one block is over instead of the output of said coded image data in response to the instructed interruption of generation of said coded image data from said control circuit.

16. The apparatus according to claim 13, wherein said control circuit includes:

a difference detection circuit, connected to said code quantity counter, for detecting a difference value between said total code quantity and said reference code quantity, a comparison circuit, connected to said difference detection circuit, for comparing the difference value with said brought forward code quantity and instructing an interruption of generation of said coded image data by said encoding circuit when said difference value is larger than said brought forward code quantity, and for instructing an interruption of generation of said coded image data by said encoding circuit when said encoding number of times count reaches to the predetermined value; and a subtraction circuit, connected to said difference detection circuit and said comparison circuit, for generating a carried forward code quantity by subtracting said difference value from said brought forward code quantity and supplying said carried forward code quantity to said comparison circuit.

17. The apparatus according to claim 16, wherein said control circuit further includes a block-number counter, connected to said subtraction circuit, for counting the number of blocks of the image data supplied to said encoding circuit and generating a reset trigger each time the counted number reaches to a predetermined value, and wherein said subtraction circuit initializes said brought forward code quantity in response to said reset trigger and supplies said initialized brought forward code quantity to said comparison circuit.

18. The apparatus according to claim 17, wherein one screen is divided into a plurality of areas, each area includes a plurality of blocks, initial values of a plurality of brought forward code quantities are set to a plurality of areas respectively, and said control circuit further includes a register, connected to said subtraction circuit, for temporarily storing the initial values of said brought forward code quantities and selectively supplying the initial value of the brought forward code quantity corresponding to the area associated with a block presently being encoded.

* * * * *